US012587504B2

(12) United States Patent
Talati

(10) Patent No.: US 12,587,504 B2
(45) Date of Patent: *Mar. 24, 2026

(54) CONNECTIONLESS-VIRTUAL PRIVATE NETWORK FOR SECURE CLOUD TO USER COMMUNICATION OVER THE INTERNET USING A PLURALITY OF SERVERS

(71) Applicant: Talati Family LP, Sunnyvale, TX (US)

(72) Inventor: Kirit K. Talati, Sunnyvale, TX (US)

(73) Assignee: Talati Family LP, Sunnyvale, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/195,323

(22) Filed: Apr. 30, 2025

(65) Prior Publication Data

US 2025/0260669 A1 Aug. 14, 2025

Related U.S. Application Data

(63) Continuation of application No. 18/759,479, filed on Jun. 28, 2024, now Pat. No. 12,294,568, which is a continuation of application No. PCT/US2023/026271, filed on Jun. 26, 2023.

(60) Provisional application No. 63/355,403, filed on Jun. 24, 2022.

(51) Int. Cl.
 *H04L 9/00* (2022.01)
 *H04L 9/40* (2022.01)
(52) U.S. Cl.
 CPC ................................ *H04L 63/0272* (2013.01)

(58) Field of Classification Search
 CPC .................................................... H04L 63/0272
 See application file for complete search history.

(56) References Cited

U.S. PATENT DOCUMENTS

| | | | | |
|---|---|---|---|---|
| 9,088,568 B1 * | 7/2015 | Talati | ...................... | H04L 63/12 |
| 2015/0249644 A1 * | 9/2015 | Xu | .......................... | H04L 67/10 |
| | | | | 726/1 |
| 2016/0099968 A1 * | 4/2016 | Chopra | ................. | H04L 9/0833 |
| | | | | 713/151 |
| 2022/0078045 A1 * | 3/2022 | Shribman | ........... | H04L 61/2589 |

\* cited by examiner

*Primary Examiner* — Jeffrey C Pwu
*Assistant Examiner* — Helai Salehi

(57) ABSTRACT

The disclosure provides a system/method/scheme to securely send data from a cloud, or cloud service provider, to users via a secure connectionless system, referred to herein as a C-VPN communication infrastructure (C-VPN CI). In one example a method of communicating from a cloud service provider to a user via a C-VPN CI includes: (1) obtaining, by a cloud service provider, security parameters from a SDE Cloud server operating on a computing system of the cloud service provider, wherein the security parameters include a set of mathematical rules and values for converting plain text to ciphertext, (2) creating a secure communication using the security parameters received from the SDE Cloud server, wherein the secure communication includes a secure header and secure data, and (3) sending the secure communication to the user via a generic electronic message delivery system.

25 Claims, 18 Drawing Sheets

Cloud Computing Service Models

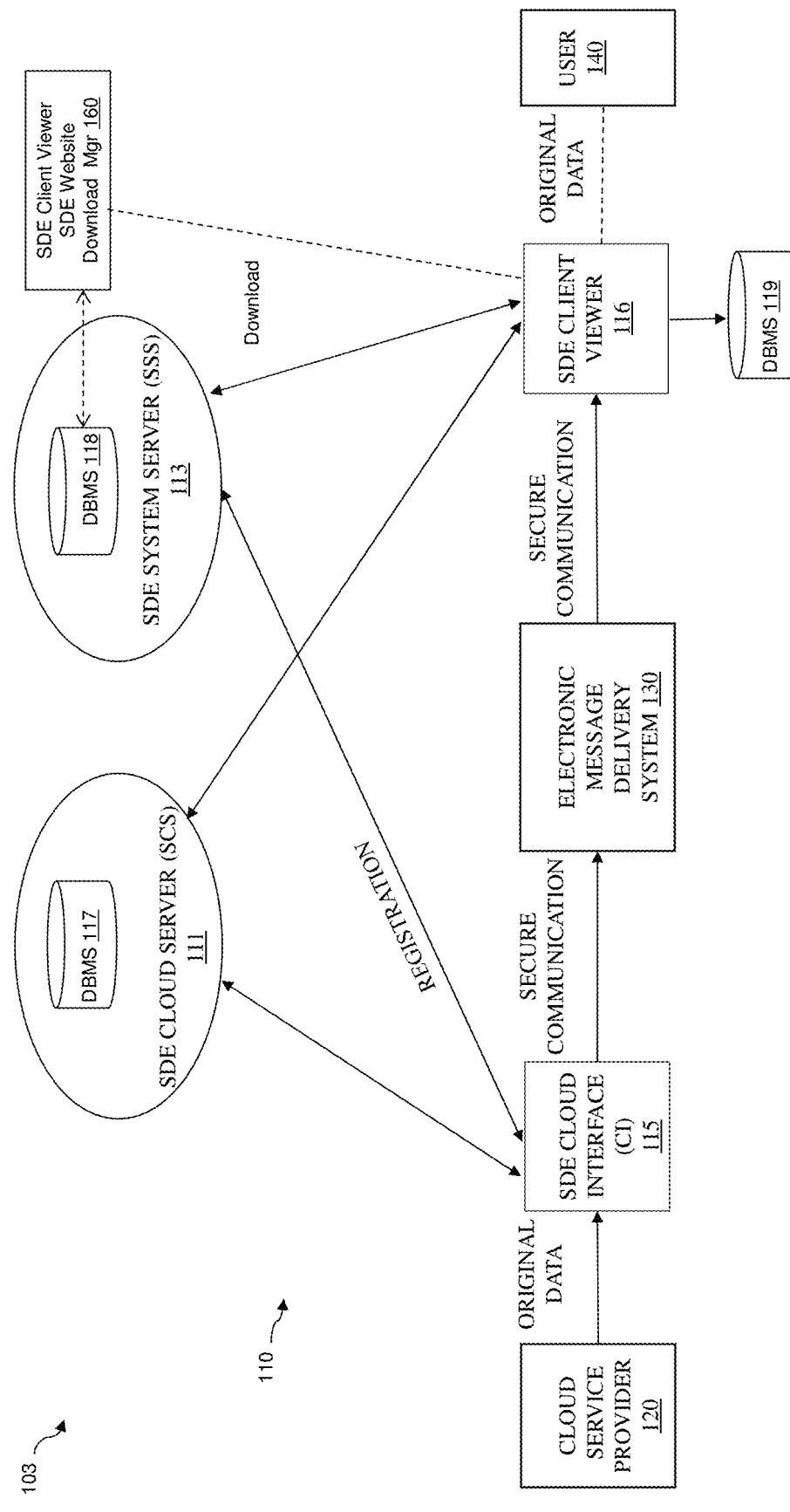
FIG. 1B Cloud Computing Service Models

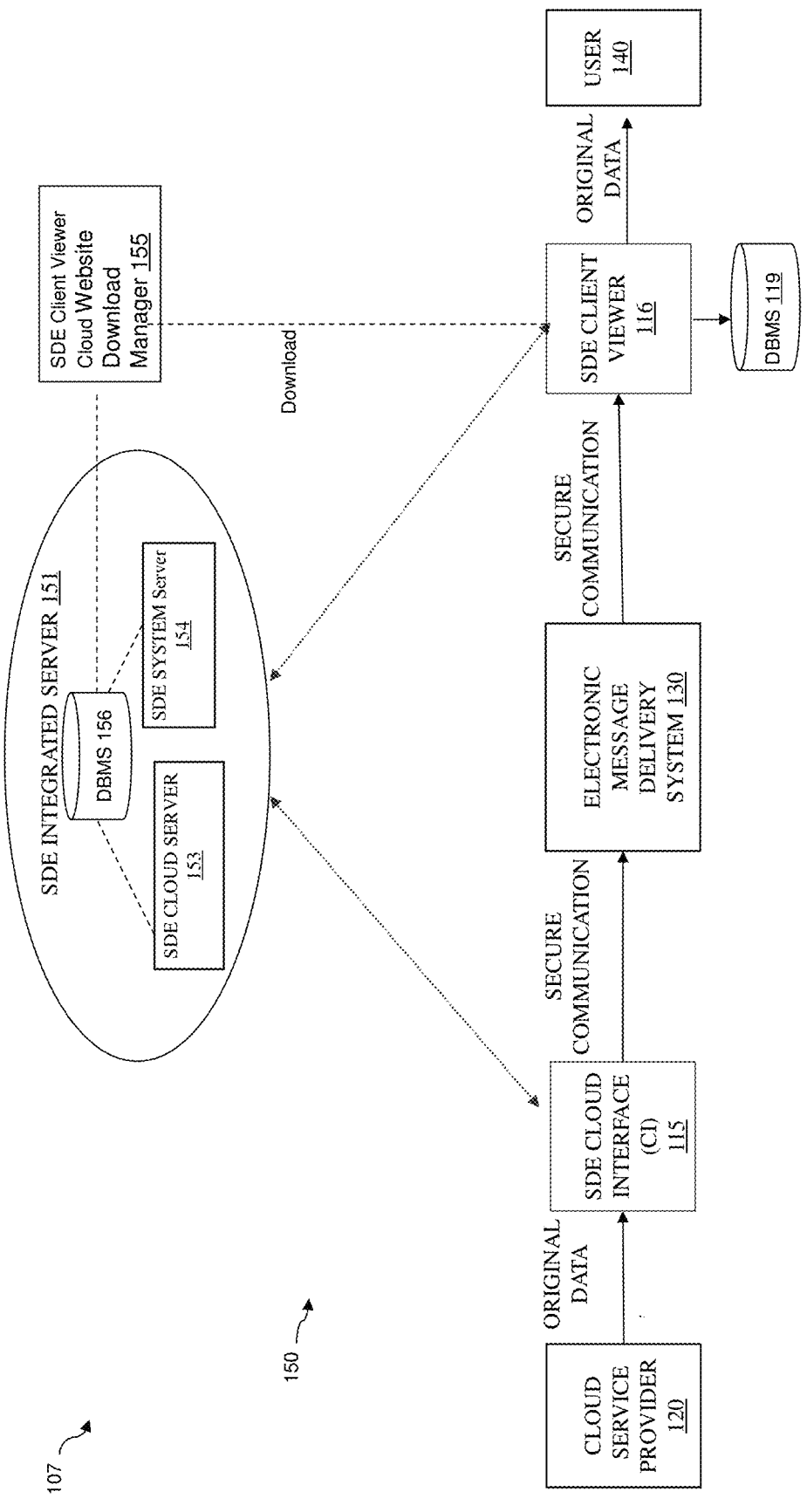
FIG. 1C On-Premises Cloud Computing Models

200

| Secure Document Header using Security Parameters SMDDK<br>210 | | | | | Secure Data using Security Parameters MDDK<br>220 |
|---|---|---|---|---|---|
| ODTID<br>(Originator Data Transaction ID)<br>230 | Cloud Server IP<br>240 | Ext<br>(Extension such as "docx")<br>250 | Cloud ID<br>(Email Address)<br>260 | RID<br>270 | Data<br>Name<br>280 | Data<br>(such as a document)<br>290 |
| Generic Secure Document Name with extension ".sde"<br>295 | | | | | |

Fig. 2A Document Header & Data

Figure 2B:
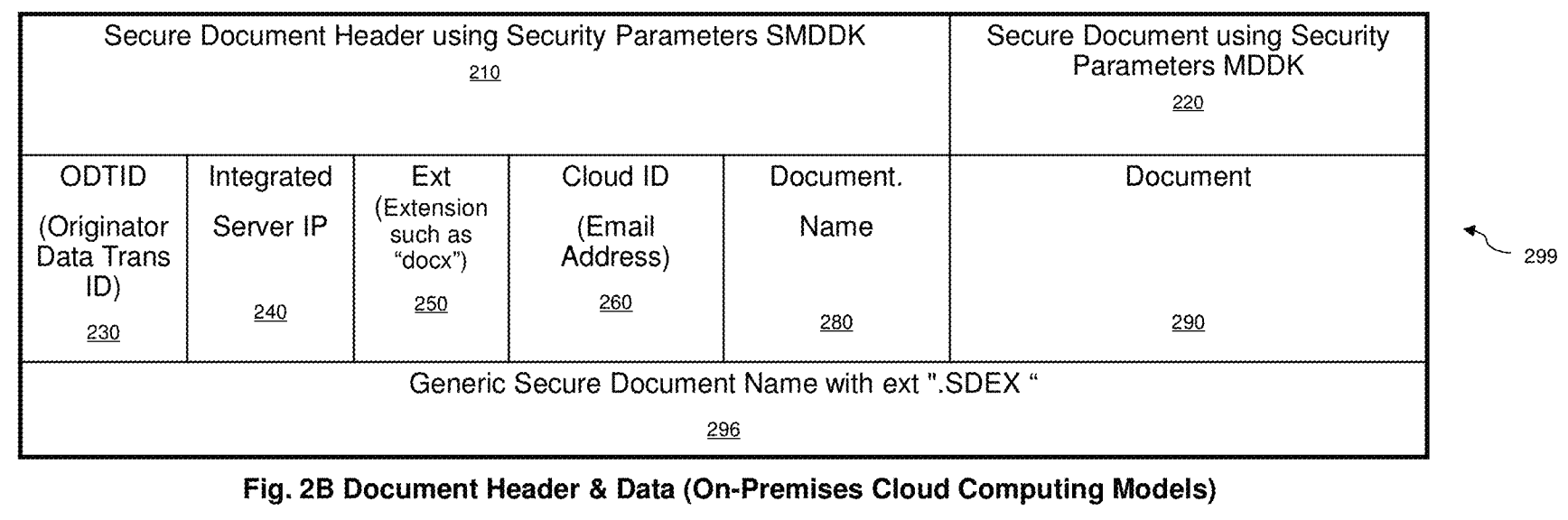

299

| Secure Document Header using Security Parameters SMDDK 210 | | | | Secure Document using Security Parameters MDDK 220 |
|---|---|---|---|---|
| ODTID (Originator Data Trans ID) 230 | Integrated Server IP 240 | Ext (Extension such as "docx") 250 | Cloud ID (Email Address) 260 | Document. Name 280 |
| | | | | Document 290 |
| Generic Secure Document Name with ext ".SDEX " 296 | | | | |

Fig. 2B Document Header & Data (On-Premises Cloud Computing Models)

300

| Header Control 310 | | CMD Request Secured Using Security Parameters VMDDK  320 | | | | |
|---|---|---|---|---|---|---|
| CMD Type 312 | UID<br>316 | UID Authentication<br>321 | Header Data<br>323 | Header Data<br>325 | Header Data<br>327 | Header Data<br>329 |
| R (Registration)<br>(SDE CI or SDE Client) | UID | Authentication Code | VMDDK (If provided by UID) | Server IP (SDE CI) | Phone Number | PWD/PIN |
| V (Verify PWD/PIN) | UID | Authentication Code | | PWD | PIN | |
| U (Update PWD/PIN) | UID | Authentication Code | | PWD | PIN | |
| F – Forgot PWD/PIN | UID | Authentication Code | | | | |
| Query a | RID | Authentication Code | | OID | | |
| Query u | OID | Authentication Code | | | | Server IP |

FIG. 3A – SDE System Server (CMD) – Used by SDE Client Viewer & Registration Request CMD by SDE CI

330

| Header Control 340 | | | CMD Reply Secured Using Same Security Parameters used with associated 3A Request CMD 350 | | |
| --- | --- | --- | --- | --- | --- |
| CMD 342 | Status 344 | Action 346 | Response 352 | Response 354 | Response 356 |
| R | Success Error | Process Input Display Error | Initial Activation Date | OID (Alpha-Numeric ID) | VMMDK (if not provided by UID) |
| V | Success Error | Process Input Display Error | | | |
| U | Success Error | Process Input Display Error | | | |
| Query a | Success | Continue Access MDDK from CS server of OID | Cloud Server IP | VMDDK of Cloud ID | |
| Query u | Success | Continue | | | |
| F | Success | Displays Notification message of "PWD|PIN to be sent to UID Email Address" | | | |

Fig 3B SDE System Server Response/Reply to 3A Request CMD

360

| Header Control 370 | | CMD Request Secured using Security Parameters VMDDK 374 | | | |
|---|---|---|---|---|---|
| CMD Type 371 | UID 373 | <Delete Col> UID Authentication[3] 375 | Header Data 376 | Header Data 377 | Header Data 378 |
| C (Create ODTID\|MDDK) | OID | Authentication Code | | MDDK (if created by OID) | Recipient (Client) E-Mail Address |
| A (Access MDDK) | OID | Authentication Code | RID (CID) | ODTID | |
| R (Revoke Recipient Document Access) | OID | Authentication Code | ODTID | RID | |

FIG 3C Request (CMD) of SDE Cloud Server

380

| Header Control 390 | | CMD Reply Secured Using Same Security Parameters used with associated 3C Request CMD 395 | | |
|---|---|---|---|---|
| CMD 391 | Status 392 | Action (performed by SDE CI/SDE Client) 393 | Response 397 | Response 398 | Response 399 |
| C | Success Error | Process Input Display Error | ODTID | MDDK (if not sent by OID) | |
| A | Success Error | Process Input Display Error | | MDDK | |
| r | Success Error | Continue[1] | | | |

Fig 3D Response/Reply CMD of SDE Cloud Server to Request 3C CMD

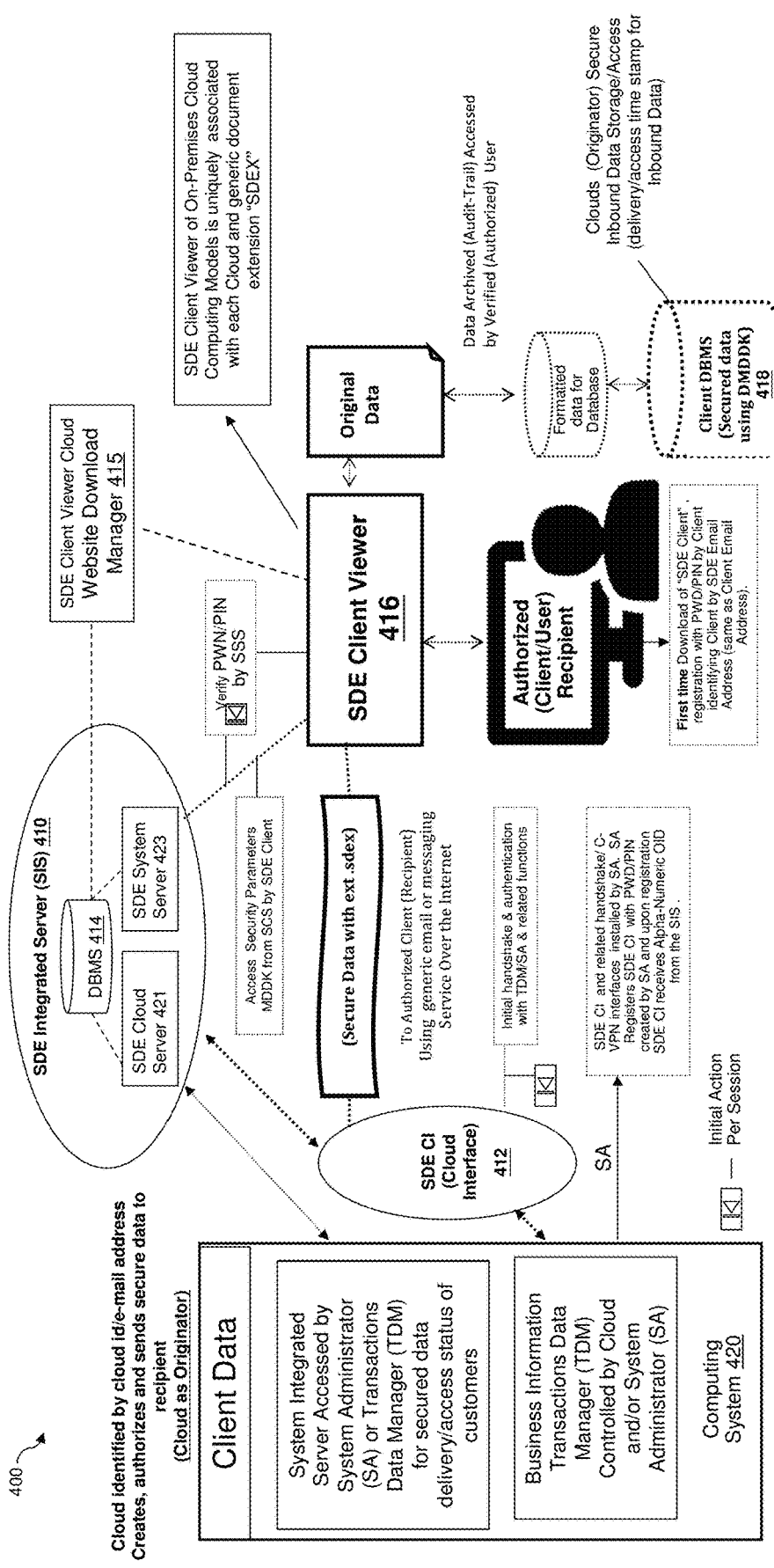
Fig. 4A *Cloud to Users Access using Connectionless-Virtual Private Network over the Internet ... "On-Premises" Cloud Computing Models*

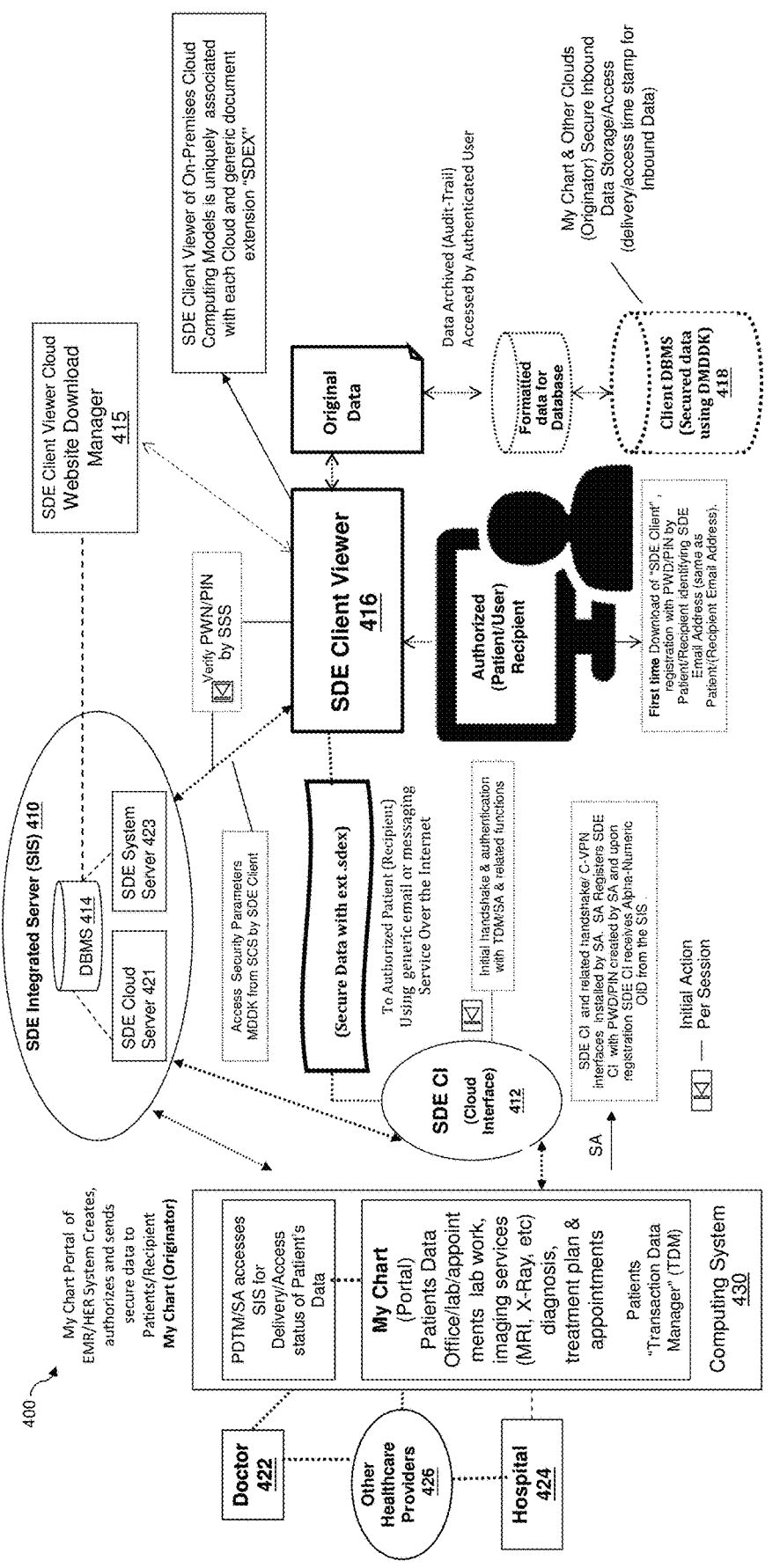
Fig 4B  My Chart_Cloud-to- Patient Access using Connectionless-VPN over the Internet… "On-Premises" Cloud Computing Models

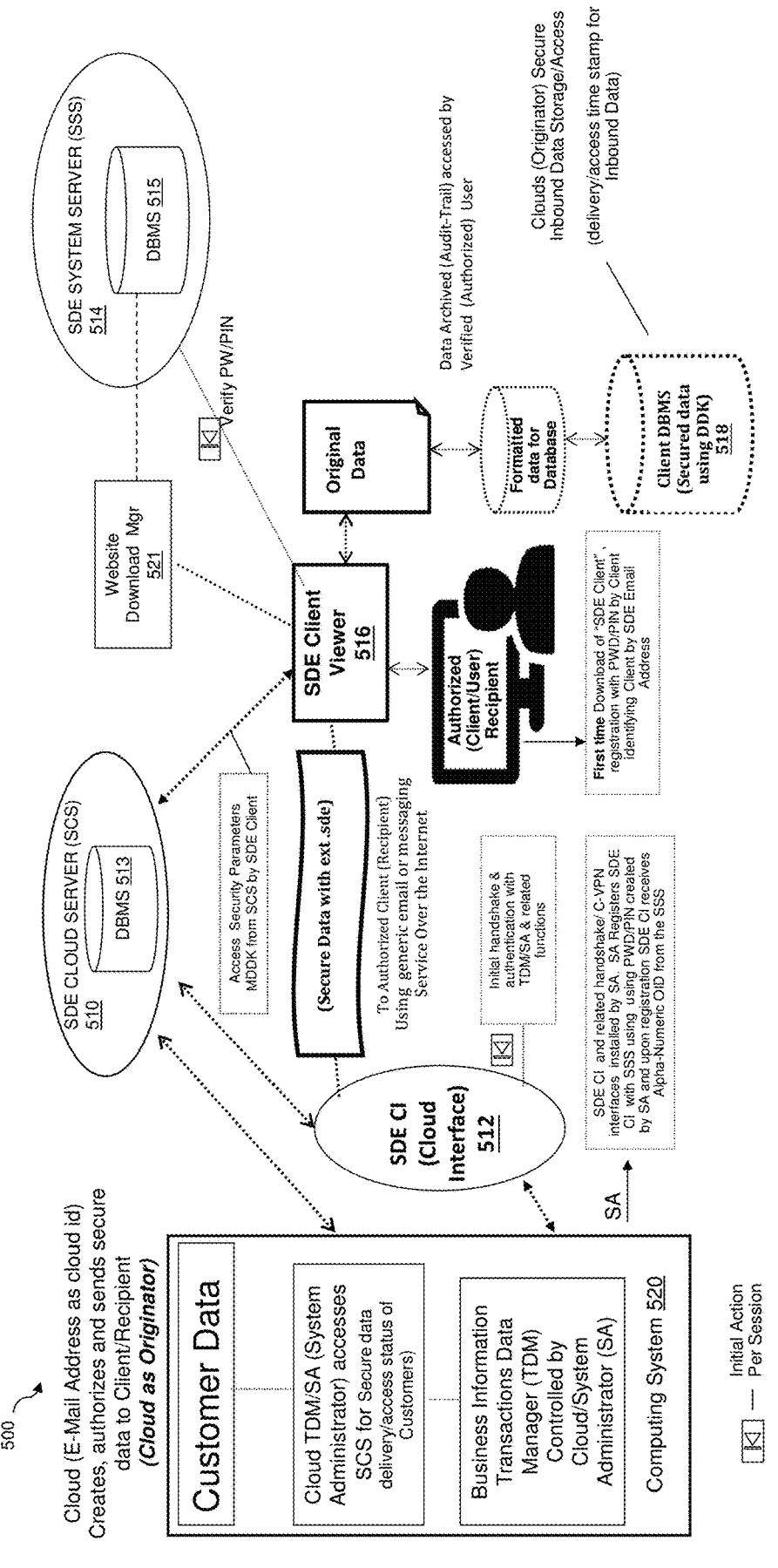
Fig. 5A *Cloud to Users Access using C-VPN over the Internet ... Cloud Computing Service Models*

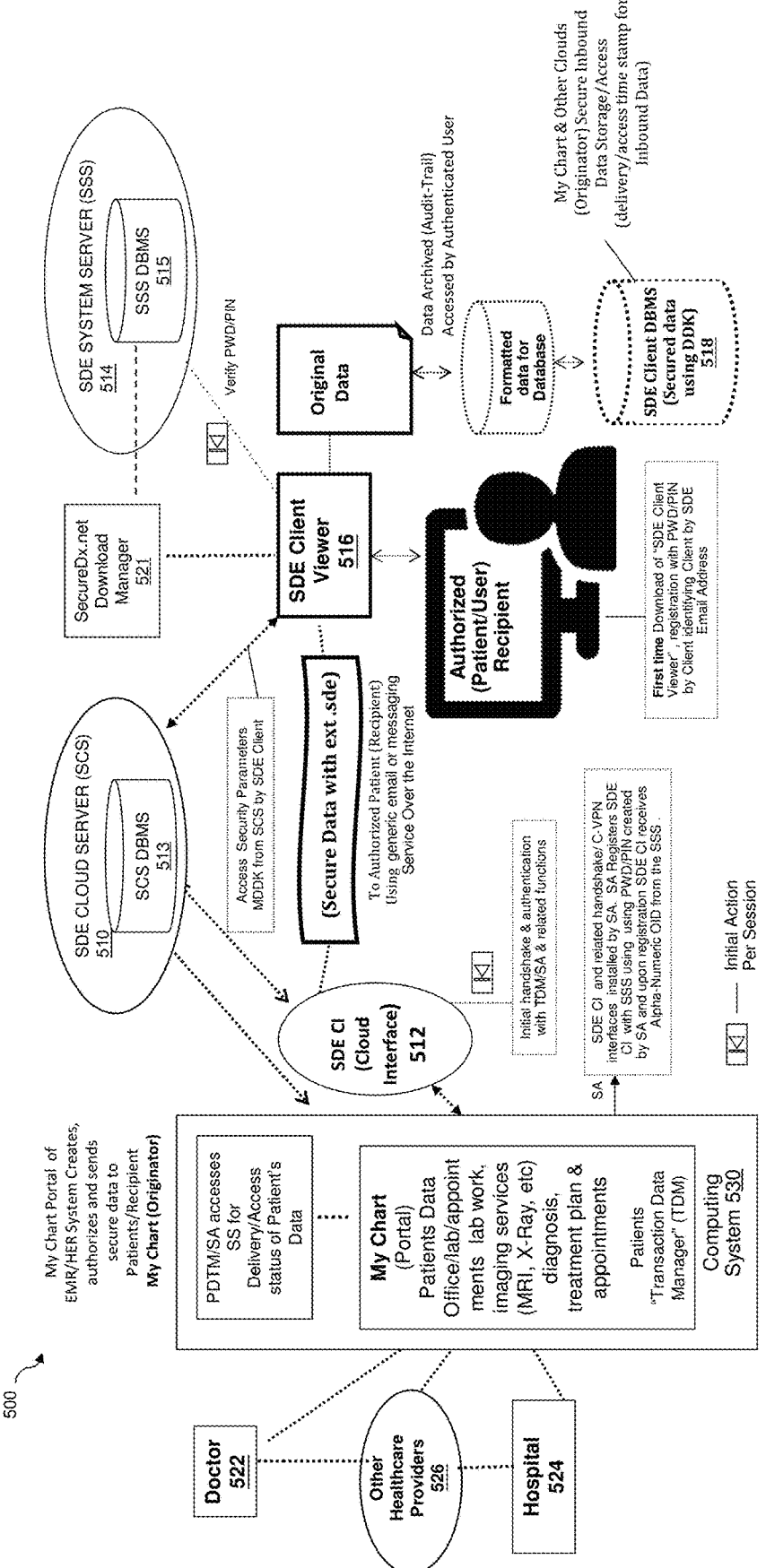
Fig. 5B My Chart Cloud-to-Patient Access using Connectionless-VPN over the Internet... Cloud Computing Service Models

Figure 6:
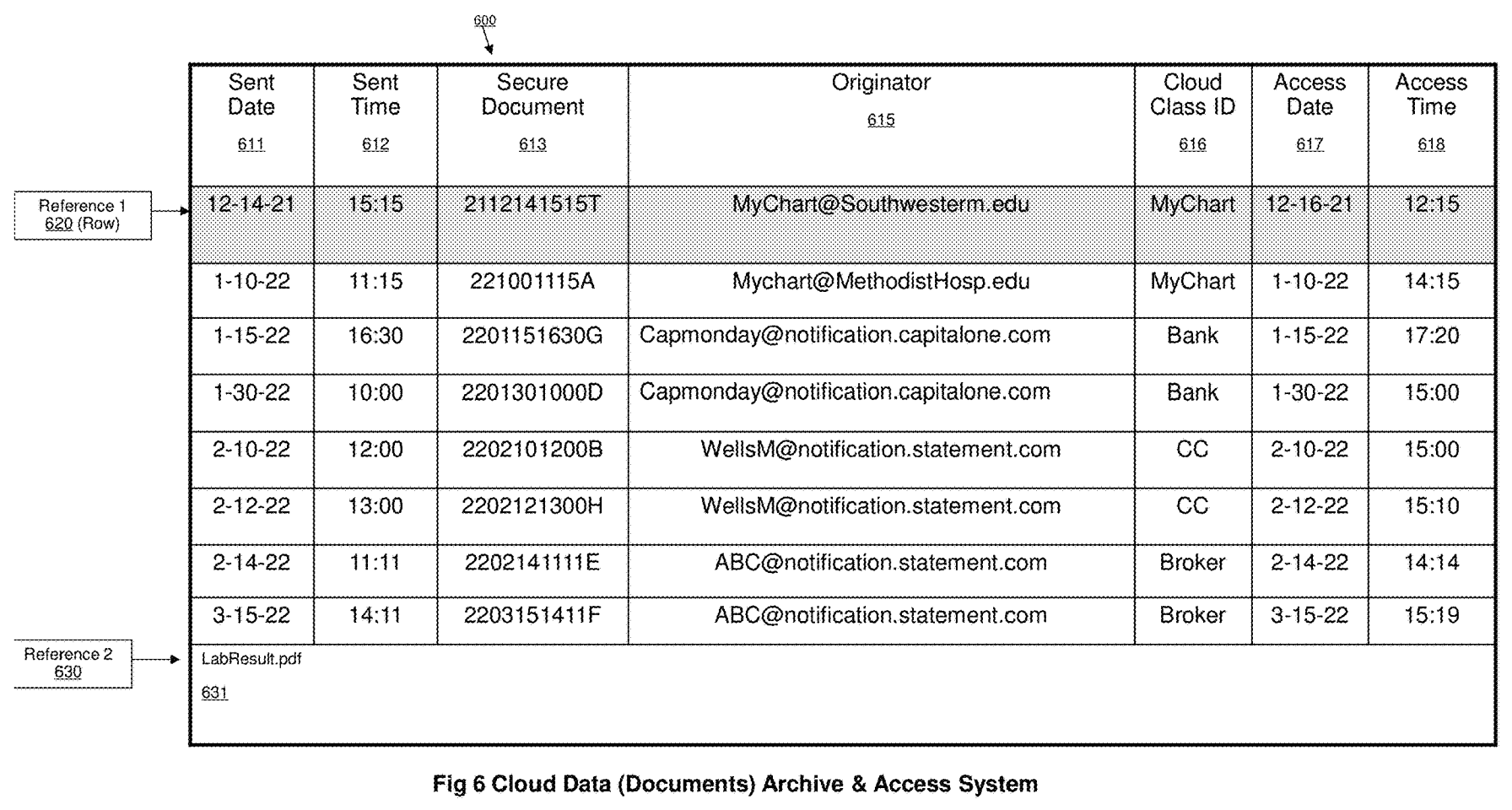

600

| Sent Date 611 | Sent Time 612 | Secure Document 613 | Originator 615 | Cloud Class ID 616 | Access Date 617 | Access Time 618 |
|---|---|---|---|---|---|---|
| 12-14-21 | 15:15 | 2112141515T | MyChart@Southwestern.edu | MyChart | 12-16-21 | 12:15 |
| 1-10-22 | 11:15 | 221001115A | Mychart@MethodistHosp.edu | MyChart | 1-10-22 | 14:15 |
| 1-15-22 | 16:30 | 22011516630G | Capmonday@notification.capitalone.com | Bank | 1-15-22 | 17:20 |
| 1-30-22 | 10:00 | 22013301000D | Capmonday@notification.capitalone.com | Bank | 1-30-22 | 15:00 |
| 2-10-22 | 12:00 | 22021011200B | WellsM@notification.statement.com | CC | 2-10-22 | 15:00 |
| 2-12-22 | 13:00 | 2202121300H | WellsM@notification.statement.com | CC | 2-12-22 | 15:10 |
| 2-14-22 | 11:11 | 22021411111E | ABC@notification.statement.com | Broker | 2-14-22 | 14:14 |
| 3-15-22 | 14:11 | 22031511411F | ABC@notification.statement.com | Broker | 3-15-22 | 15:19 |

Reference 1 620 (Row)

Reference 2 630

LabResult.pdf
631

Fig 6 Cloud Data (Documents) Archive & Access System

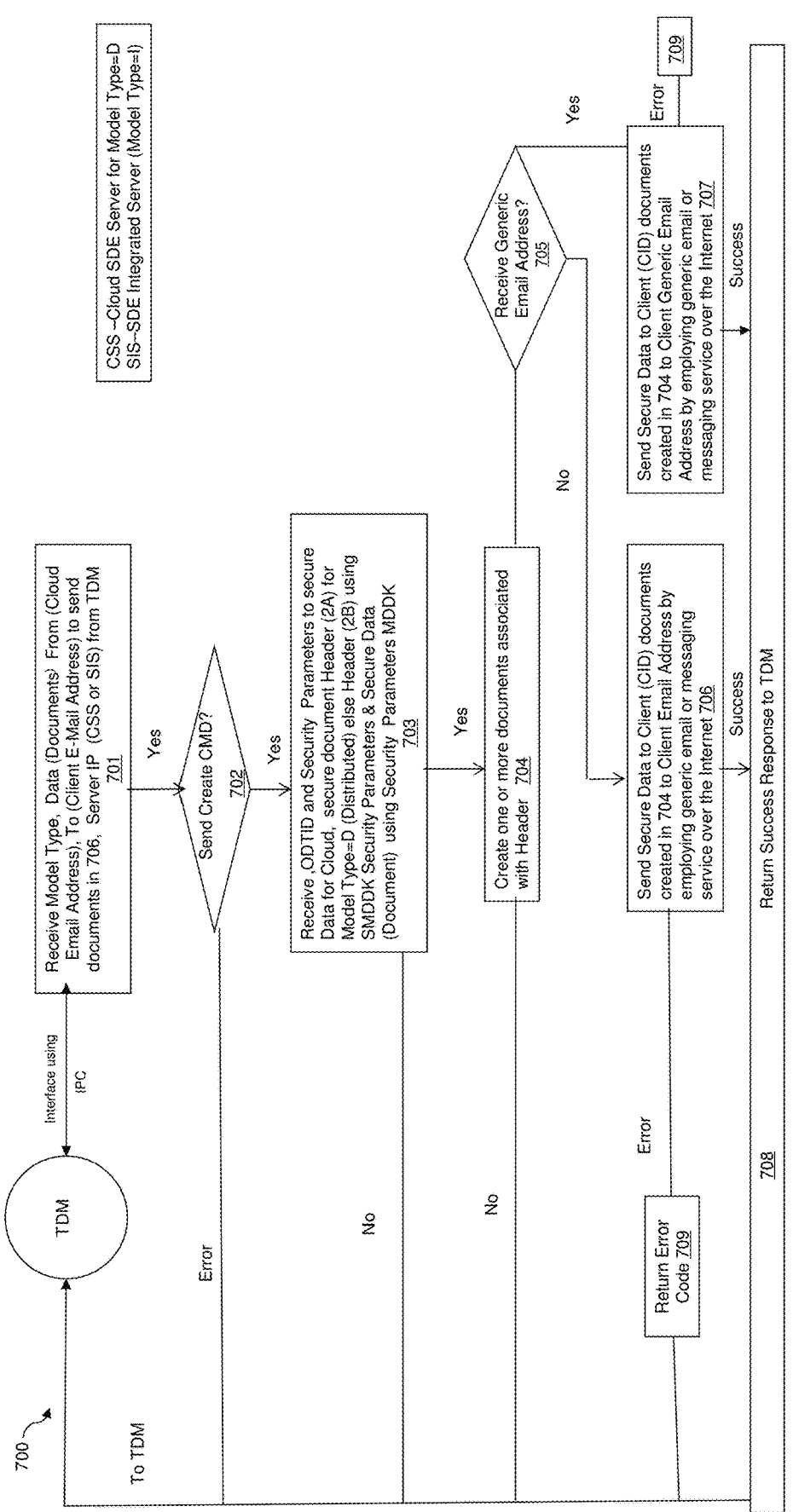

CSS –Cloud SDE Server for Model Type=D
SIS–SDE Integrated Server (Model Type=I)

Receive Model Type, Data (Documents) From (Cloud Email Address), To (Client E-Mail Address) to send documents in 706, Server IP (CSS or SIS) from TDM 701

Send Create CMD? 702

Receive OdDTID and Security Parameters to secure Data for Cloud, secure document Header (2A) for Model Type=D (Distributed) else Header (2B) using SMDDK Security Parameters & Secure Data (Document) using Security Parameters MDDK 703

Create one or more documents associated with Header 704

Receive Generic Email Address? 705

Send Secure Data to Client (CID) documents created in 704 to Client Generic Email Address by employing generic email or messaging service over the Internet 707

Send Secure Data to Client (CID) documents created in 704 to Client Email Address by employing generic email or messaging service over the Internet 706

Return Error Code 709

Return Success Response to TDM 708

Interface using IPC

TDM

To TDM

Error

709

Fig. 7A  SDE Cloud Interface (CI)

700

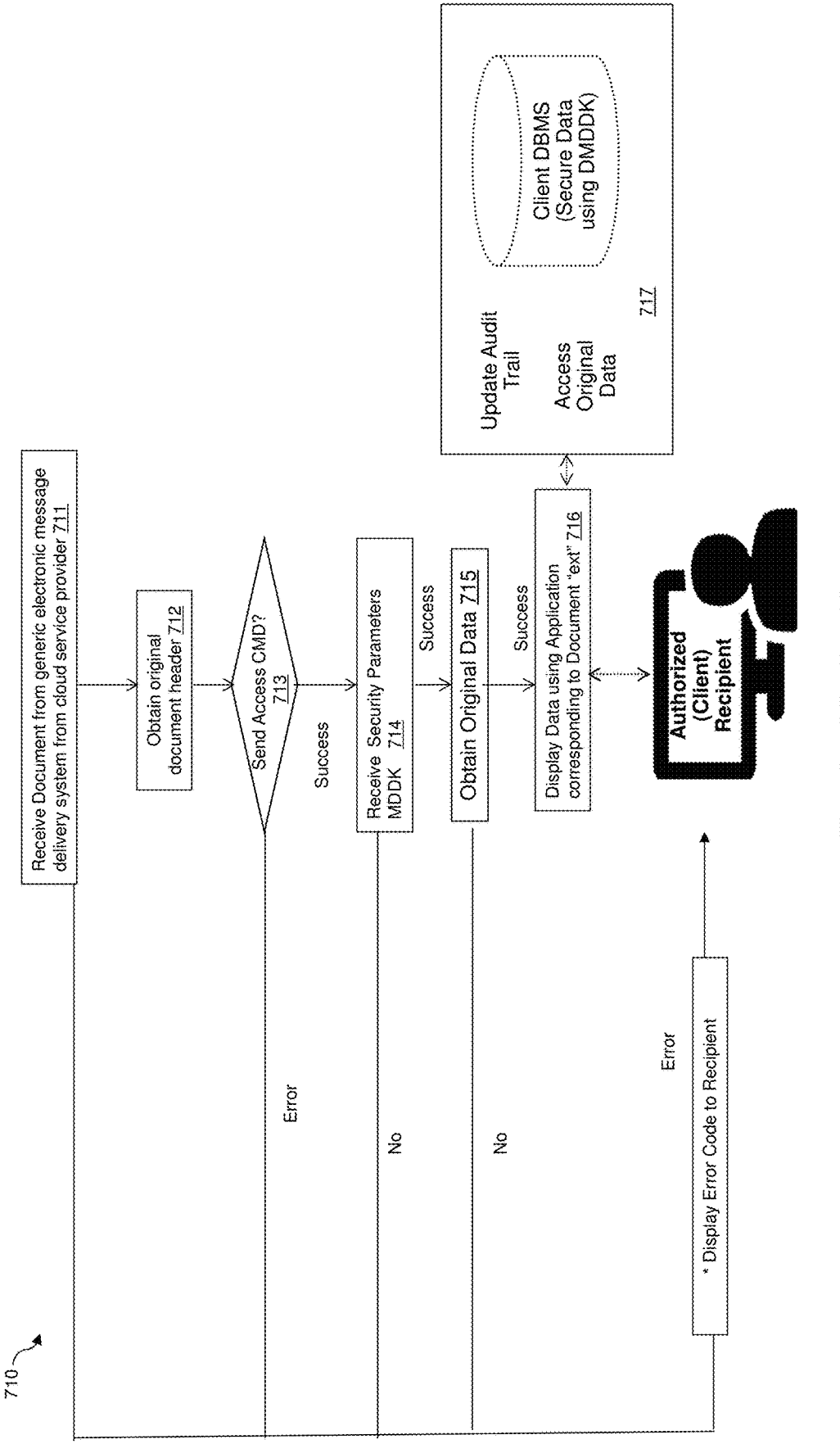

Receive Document from generic electronic message delivery system from cloud service provider 711

Obtain original document header 712

Send Access CMD? 713

Receive Security Parameters MDDK 714

Obtain Original Data 715

Display Data using Application corresponding to Document "ext" 716

Success

Success

Success

Error

No

No

Error

* Display Error Code to Recipient

Update Audit Trail

Access Original Data

Client DBMS (Secure Data using DMDDK)

717

Authorized (Client) Recipient

Fig. 7B  SDE Client Viewer

710

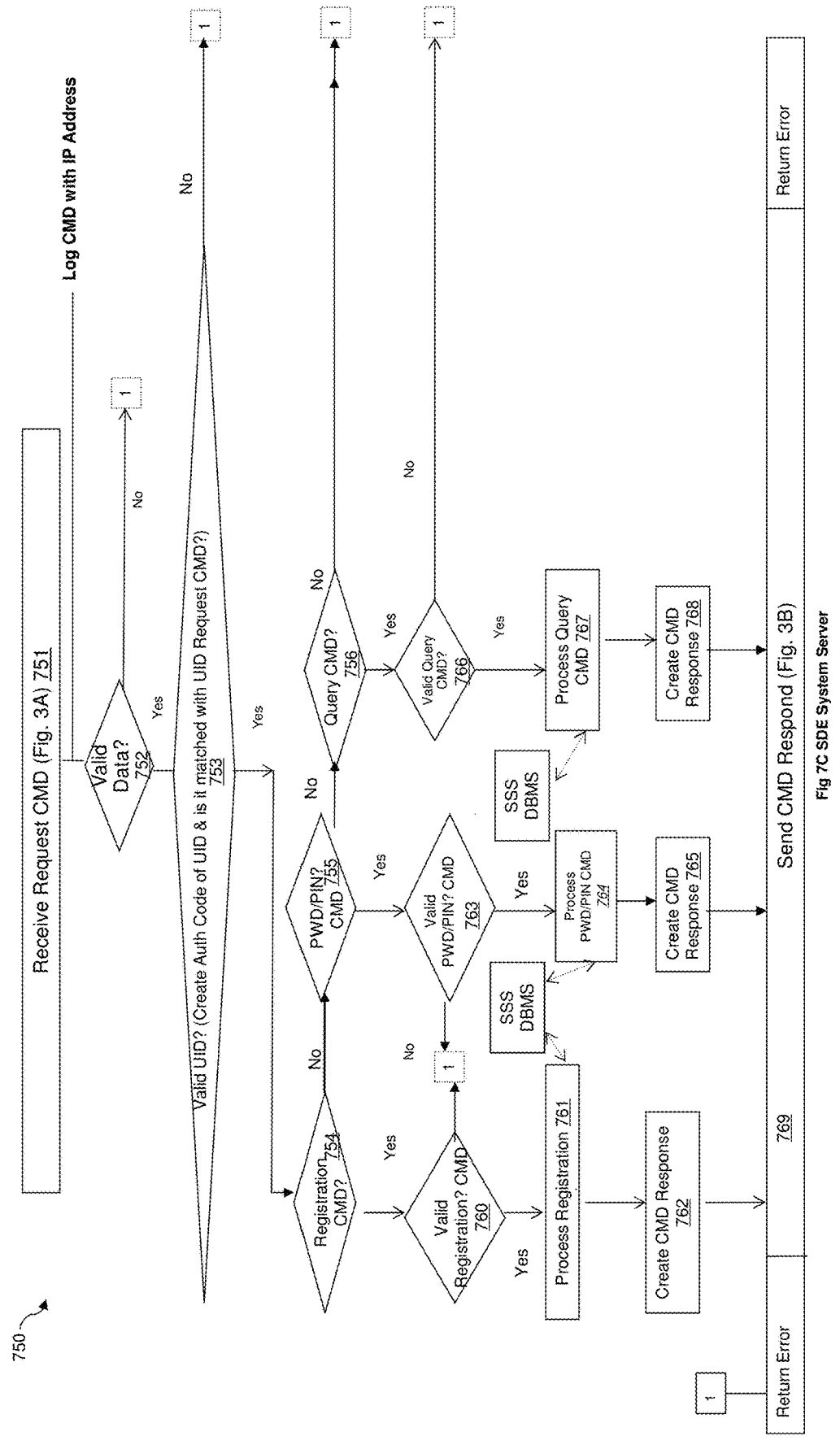
Fig 7C SDE System Server

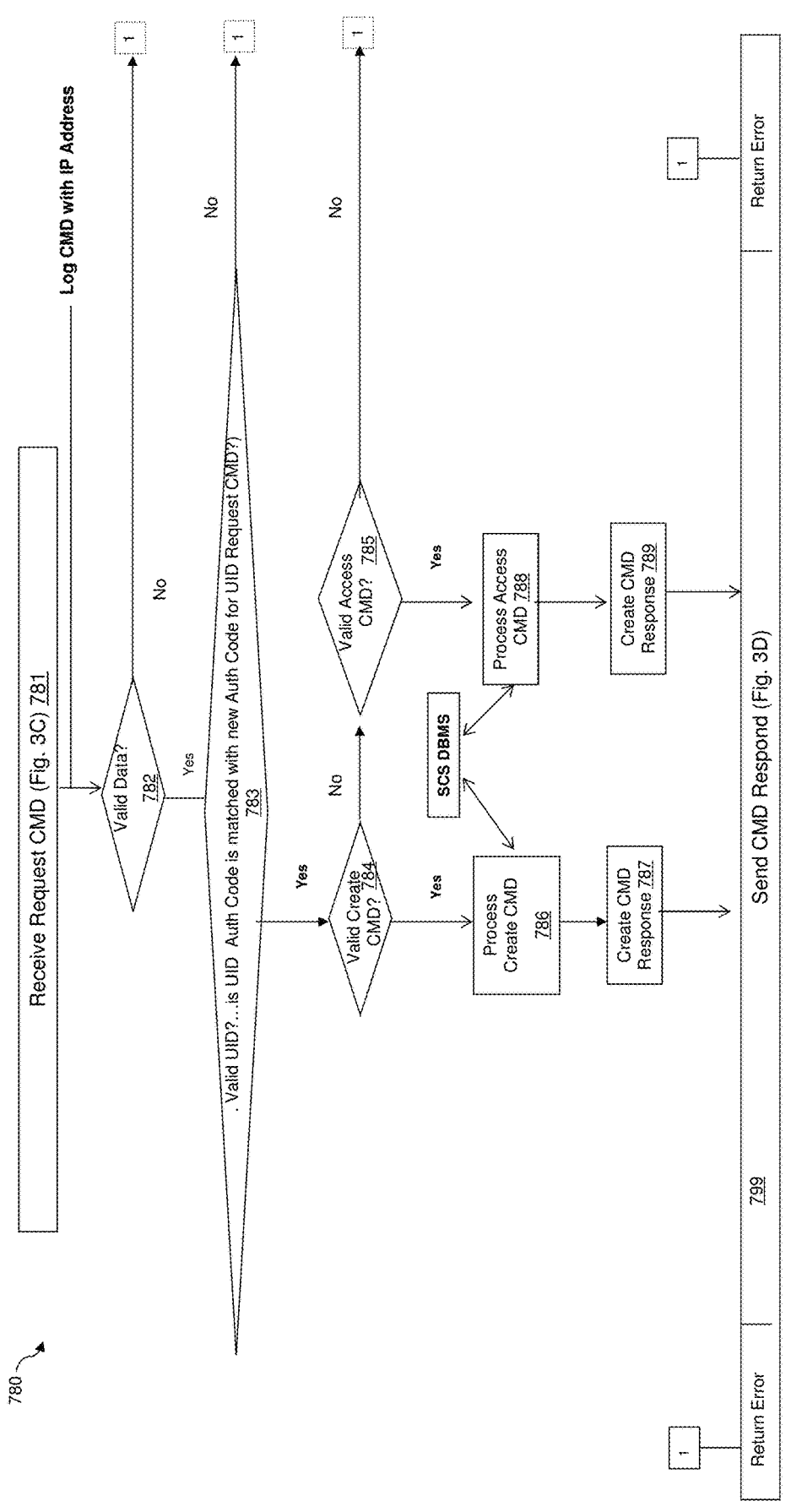
Figure 7D  SDE Cloud Server

CONNECTIONLESS-VIRTUAL PRIVATE NETWORK FOR SECURE CLOUD TO USER COMMUNICATION OVER THE INTERNET USING A PLURALITY OF SERVERS

CROSS-REFERENCE TO RELATED APPLICATIONS

This application is a continuation of U.S. patent application Ser. No. 18/759,479, entitled "A CONNECTIONLESS-VIRTUAL PRIVATE NETWORK FOR CLOUD TO USER COMMUNICATION OVER THE INTERNET USING A PLURALITY OF SERVERS", filed on Jun. 28, 2024, by Kirit K. Talati, which is a bypass continuation application of international application PCT/US2023/026271, entitled "A CONNECTIONLESS-VIRTUAL PRIVATE NETWORK FOR CLOUD TO USER COMMUNICATION OVER THE INTERNET USING A PLURALITY OF SERVERS", filed on Jun. 26, 2023, by Kirit K. Talati, which claims the benefit of U.S. Provisional Application Ser. No. 63/355,403 filed on Jun. 24, 2022, by Kirit K. Talati, entitled "APPARATUS, SYSTEM AND METHOD OF CONNECTIONLESS SECURE DATA EXCHANGE AMONG CLOUDS AND CLIENTS", wherein all of the above applications are commonly assigned with the present disclosure and incorporated herein by reference in their entirety.

TECHNICAL FIELD

This disclosure generally relates to the communication between cloud service providers and one or more users using electronic communication services, such as email or SMS text services. More specifically, the disclosure relates to sending secure data from cloud service providers to computing devices associated with users over generic electronic message delivery systems using a connectionless-Virtual Private Network (C-VPN) wherein Users can only access data sent by the Cloud if Cloud Authorizes the access and Users are authenticated before accessing the data.

BACKGROUND

The services offered by cloud service providers and the number of cloud users have increased exponentially making data processing and storage convenient and more efficient than ever. The whole idea of cloud computing is to shift computing and data storage to the cloud so that users can access the data remotely using any computing device, such as a computer or a smart phone, without being physically present at a specific place. The cloud refers to a pool of shared computing resources, such as servers, that are available to users on demand through web-based tools such as a browser via the Internet or other communications network. FIG. 1A illustrates several different models 101 of Cloud Computing where users access cloud services via on-premises or service models. Regardless the type of models 101, users can initiate communication sessions with clouds or servers over the Internet using devices with web-based tools.

Many entities, such as businesses and organizations, have started adopting this paradigm as a potential game changer since users can rely on "the cloud" using browsers available with computing devices, such as desktop computers or mobile computing devices, from anywhere over the Internet. As such, users are removed from the required infrastructure of physical computing because it allows users to access Clouds from anywhere using any device connected to Internet. Cloud service providers, however, cannot directly access the user's computing devices over the Internet. As such the cloud connects with users via open email notification messages to login to the cloud with a cloud URL link for a specific service, such as new updated data records or communication messages. Unfortunately, this lack of structure may allow for security "holes" that can be exploited by a third party, such as by imitated cloud email notifications to users.

SUMMARY

In one aspect, the disclosure provides a system for sending a secure communication from a cloud computing system to a computing device of a user over the internet using a plurality of servers of a connectionless-virtual private network communication infrastructure (C-VPN CI). In one example the system includes: (1) a C-VPN CI cloud interface operating on the cloud computing system, (2) a C-VPN CI client viewer operating on the computing device of the user, wherein the computing device is external to the cloud computing system, and (3) a C-VPN CI cloud server that is one of the plurality of servers and is configured to exchange security parameters with the C-VPN CI cloud interface, wherein the security parameters include at least one randomly generated document dynamic key (DDK) and one randomly generated Scramble and Compression (MSC) ID that has unique Scramble and Compression Algorithms for converting unsecured data to secure data, and wherein the C-VPN CI cloud interface is configured to create a secure communication using the security parameters, wherein the secure communication includes a secure header and secure data, wherein creating the secure data includes applying both the DDK and the Scramble and Compression Algorithms associated with the MSC ID to original data from the cloud computing system that corresponds to the secure data, and the C-VPN CI cloud interface is further configured to send the secure communication to the computing device of the user over the internet via a generic electronic message delivery system.

In another aspect, the disclosure provides a method of sending a secure communication from a cloud computing system to a computing device of a user over the internet using a plurality of servers of a connectionless-virtual private network communication infrastructure (C-VPN CI). In one example the method includes: (1) exchanging security parameters between a C-VPN CI cloud interface of the cloud computing system and a C-VPN CI cloud server that is one of the plurality of servers, wherein the security parameters include at least one randomly generated document dynamic key (DDK) and one randomly generated Mask, Scramble, and Compression (MSC) ID that has unique Scramble and Compression Algorithms for converting unsecured data to secure data and providing enhanced security, (2) creating a secure communication using the security parameters, wherein the secure communication includes a secure header and secure data and creating the secure data includes applying both the DDK and the Scramble and Compression Algorithms associated with the MSC ID to original data corresponding to the secure data, and (3) sending the secure communication from the cloud computing system to the computing device of the user over the internet via a generic electronic message delivery system, wherein the computing device of the user is external to the cloud computing system.

BRIEF DESCRIPTION OF THE DRAWINGS

For a more complete understanding of the present invention, reference is now made to the following descriptions taken in conjunction with the accompanying drawings, in which:

FIG. 1B illustrates a block diagram of an example of a secure communication system using a connectionless Virtual Private Network (C-VPN) communication infrastructure for cloud computing service models constructed according to the principles of the disclosure;

FIG. 1C illustrates a block diagram of an example of a secure communication system using a C-VPN communication infrastructure for on-premises cloud computing models constructed according to the principles of the disclosure;

FIG. 2A illustrates a diagram of an example of a general format for creating a secure communication for transmitting documents from a cloud service provider to a user for cloud computing service models constructed according to the principles of the disclosure;

FIG. 2B illustrates a diagram of an example of another general format for creating a secure communication for transmitting documents from a cloud service provider to a user in an on-premises cloud computing model according to the principles of the disclosure;

FIG. 3A illustrates a diagram of an example of a general format for command requests from SDE cloud interface (CI) and SDE client viewers to a SDE System server according to the principles of the disclosure;

FIG. 3B illustrates a diagram of an example of a general format of a response from the SDE System server to the command requests of FIG. 3A according to the principles of the disclosure;

FIG. 3C illustrates a diagram of an example of a general format for command requests from SDE CI and Client Viewers to a SDE Cloud server according to the principles of the disclosure;

FIG. 3D illustrates a diagram of an example of a general format of a response from the SDE Cloud server to the command requests of FIG. 3C according to the principles of the disclosure;

FIG. 4A illustrates a system diagram of an example of a C-VPN communication infrastructure used with an on-premises cloud computing model having the bifurcated functions of a SDE servers integrated on one or more on-premises server;

FIG. 4B illustrates a system diagram of another example of a C-VPN communication infrastructure used with an on-premises model having the bifurcated functions of a SDE servers integrated on one or more MyChart (Healthcare) on-premises server;

FIG. 5A illustrates a system diagram of an example of a C-VPN communication infrastructure having a distributed SDE servers implemented on a SDE Cloud server and a SDE System server;

FIG. 5B illustrates a system diagram of another example of a C-VPN communication infrastructure having a distributed SDE servers implemented on a SDE Cloud server and a SDE System server;

FIG. 6 illustrates an example of managing Inbound Transaction data from various C-VPN communication infrastructures, such as represented in FIGS. 4A to 5B, having secure documents sent by various cloud service providers;

FIG. 7A illustrates a flow diagram of an example of a method of sending a secure communication by a SDE CI according to the principles of the disclosure, wherein the secure communication includes secure data created from original data;

FIG. 7B illustrates a flow diagram of an example of a method of processing a received secure communication by a SDE Client Viewer according to the principles of the disclosure, wherein the secure communication includes secure data created from original data;

FIG. 7C illustrates a flow diagram of an example of a method of operation of a SDE System server processor according to the principles of the disclosure; and FIG. 7D illustrates a flow diagram of an example of a method of operation of a SDE Cloud Server processor according to the principles of the disclosure.

DETAILED DESCRIPTION

Figure 1A:
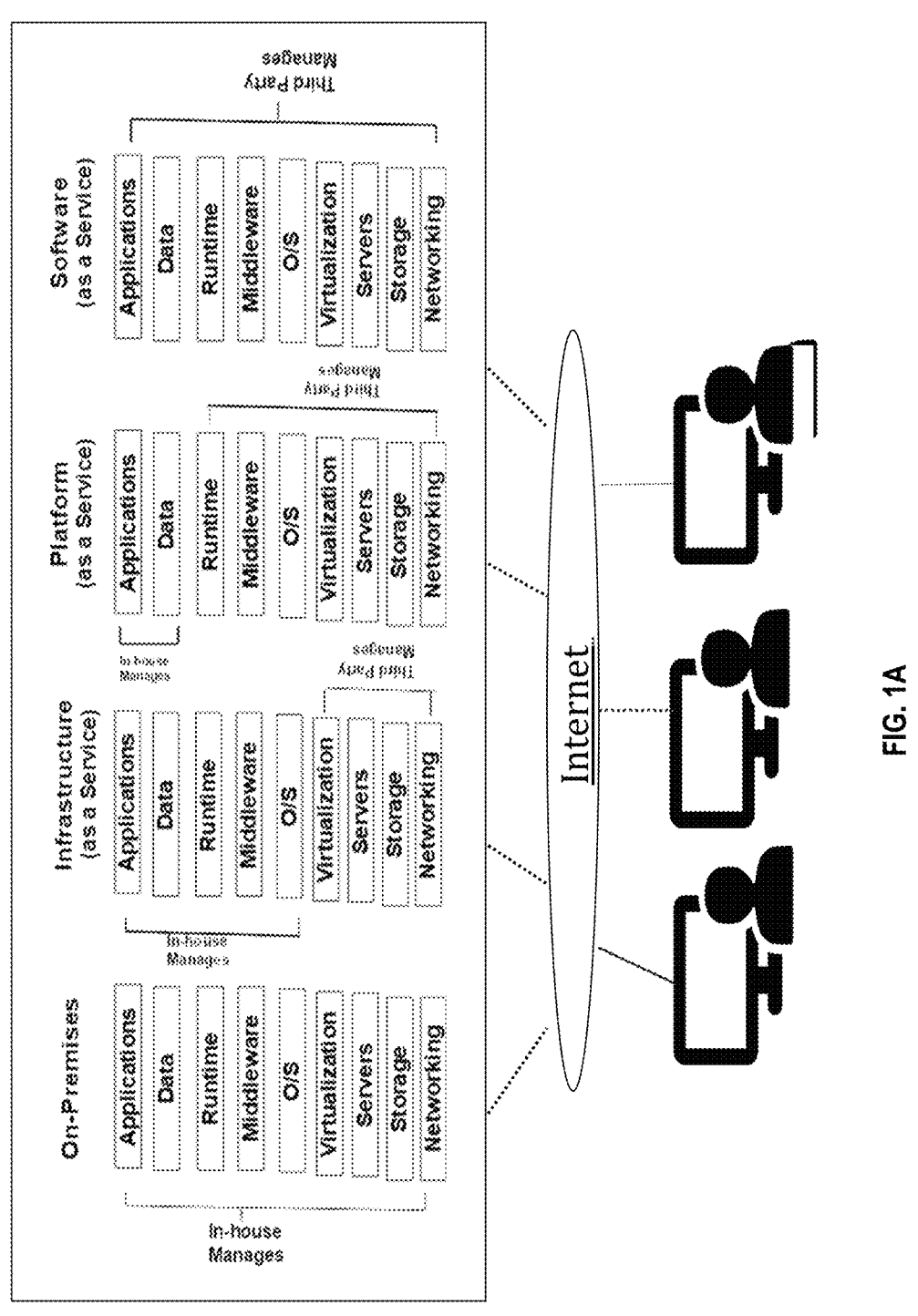
FIG. 1A illustrates a diagram showing examples of existing cloud computing models, including service models and an on-premises model, between users and cloud systems.

As noted above, a common method for users to login to the cloud is over the Internet using web tools such as Internet Browser and a URL link provided by the cloud, or a cloud service provider. A cloud service provider is an entity that uses the cloud to provide one or more services. Since a cloud service provider cannot directly access users or associated devices over the Internet, cloud service providers often connect with users via open email notification messages to login to the cloud with a cloud URL link for a specific service, such as new updated data records or communication messages. The Internet browser provides a secure protocol for the session between the cloud and users. The security used with the browser is generally acceptable by the industry, however, it may still be vulnerable from hackers or third parties. One reason for vulnerability from hackers or third parties is due to the access management software (e.g., public key infrastructure (PKI) protocol and digital certificates) that are used for authentication to transfer data between users and the cloud. Additionally, application programming interfaces (APIs) that allow one computer program to make its data available for other programs to use are often used when accessing the cloud. Integrated API's that more often used without security are not secure, however, can expose environments to malicious threats.

Thus there is a need for secure communications from the cloud to users that bring a virtual infrastructure of physical computing into the cloud over the internet. As such new technology is needed to provide enhanced security for communicating electronically from cloud service providers to users.

The disclosure provides a system/method/scheme to securely send data from a cloud, or cloud service provider, to users via a secure connectionless system, referred to herein as a C-VPN communication infrastructure. The C-VPN communication infrastructure is part of a secure communication system available to provide safe, secure transmission of data from a cloud service provider to a user. The secure communication system or secure data exchange (SDE system) can use generic electronic message delivery system for sending the data. More specifically, the disclosed C-VPN communication infrastructure allows a user to view and manage data received from one or more cloud service providers over a generic electronic message delivery system. A generic electronic message delivery system is a conventional communication system typically employed in computing devices. For example, a generic electronic message delivery system is an electronic mail delivery system or messaging system that are used by various computing or communication devices over the Internet.

The C-VPN provides direct cloud-to-client access for sending secure data including email addresses where data are delivered using generic email addresses not identifying cloud or user, without subject and generic document name to users wherein the users, or computing devices associated therewith, are part of a required infrastructure of physical computing over the Internet. This basically emulates Virtual Private Network using connectionless communication infrastructure such as generic email or messaging service. Accordingly, cloud service providers can securely send data to users without having to invite users to login to the cloud with a cloud URL link. With the C-VPN communication infrastructure, the cloud service providers can securely send the information to the user by employing the generic electronic message delivery system over an Internet where authentication of the cloud service provider and users are provided without need of the digital certificates. Instead, the C-VPN communication infrastructure allows secure communications from cloud-to-users over the Internet that is only accessible by authorized users who are granted the access.

Advantageously, the C-VPN communication infrastructure uses a plurality of servers to provide the cloud-to-users secure communications. Having a plurality of servers allows a distribution of the functionalities used for sending secure data from cloud service providers to users over generic electronic message delivery systems and advantageously preserve management and control of Secure Data Infrastructure of Cloud Computing. A server is a computing device and/or computer program that manages access to a network resource or service. A SDE cloud server and a SDE system server provide examples of the servers that can be used by the C-VPN communication infrastructure, i.e., C-VPN servers. FIGS. 3A and 3B provide examples of the command requests and responses/replies (collectively referred to herein as responses) representing the functionality of a SDE system server and FIGS. 3C and 3D provide examples of the command requests and responses/replies representing the functionality of a SDE cloud server. The SDE cloud and SDE system servers can have a designated server operations, such as processing the particular requests/responses directed thereto by an SDE Integrated Server used with on-premises cloud computing operation as shown in FIG. 1C.

A C-VPN communication infrastructure can be used for both cloud computing service models and on-premises cloud computing models. Regardless the model, the C-VPN communication infrastructure allows the cloud to send data to users, including documents such as monthly bank/credit card statements, lab results, doctor's medical record update, or appointment reminders, thereby eliminating the users' need to logon to the cloud for this information. Essentially, the C-VPN communication infrastructure provides a Virtual Physical Infrastructure between the Cloud and users over the Internet, thereby making the Internet a private secure communication network allowing cloud service providers to send secure data to users.

The C-VPN communication infrastructure can use an API, such as Transaction Data Manager (TDM), to send data via a SDE cloud interface (SDE CI) to users. The API can be added as an additional service with various clouds. Note that a SDE CI used by a C-VPN communication infrastructure is registered with SDE System Server for Cloud computing Service Models or SDE Integrated Server for On-Premises Cloud Models. These servers can also authenticate SDE CI using PWD/PIN used during registration process associated with each cloud service provider.

FIG. 1B illustrates a block diagram of an example of a secure cloud-to-user communication system 103 using a C-VPN communication infrastructure (C-VPN CI) 110 for cloud computing service models constructed according to the principles of the disclosure. FIG. 1C illustrates a block diagram of an example of a secure communication system 107 using a C-VPN CI 150 for on-premises cloud computing models constructed according to the principles of the disclosure. For cloud computing service models such as in FIG. 1B, the SDE cloud server and the SDE system server are distributed. For on-premises cloud computing models such as in FIG. 1C, the SDE cloud server and the SDE system server are integrated and denoted as SDE integrated server 151, wherein SDE integrated server 151 actually redirects unique type of commands, such as CMD type 312 of FIG. 3A, to SDE System Server 154 and unique type of commands, such as CMD type 371 of FIG. 3C, to SDE Cloud Server 153 to process the type of commands (also referred to herein as requests or command requests) and send responses to SDE CI 115 or SDE Client Viewer 116 who created the CMD type 312 or CMD type 371 requests. FIGS. 4A and 4B provide more detailed examples of an on-premises cloud computing model having an SDE integrated server directing the type of requests to an appropriate SDE Cloud or System servers, and FIGS. 5A and 5B illustrate a more detailed example of a cloud computing service model having distributed servers, SDE cloud server of computing system of cloud service provider and SDE system server. FIGS. 2A and 2B illustrate examples of a secure communication that can be transmitted from a cloud service provider to a user using C-VPN CI 110 and 150.

Regarding FIG. 1B, the C-VPN CI 110 allows direct cloud-to-client (or user) communications over an electronic communication system, such as from cloud service provider 120 to user 140 via electronic message delivery system 130. The cloud service provider 120 uses the cloud to provide services for clients, such as the user 140. The cloud used by the cloud service provider 120 and computing devices of the user 140 employ processors, browsers, and electronic mail delivery systems and messaging systems. Each of these can be conventional systems typically employed in computing devices. As noted above, the electronic mail delivery system and the messaging systems are referred to herein as generic electronic message delivery systems, such as electronic message delivery system 130.

The C-VPN CI 110 includes a SDE cloud server 111, a SDE system server 113, system server 113 SDE CI 115, and SDE Client Viewer 116. The C-VPN CI 110 also includes one or more distributed data base management systems (DBMS), with DBMS 117 associated with the SDE cloud server 111, DBMS 118 associated with the SDE system server 113, and DBMS 119 associated with the SDE client viewer 119.

FIGS. 3C and 3D provide examples of the type of processing performed by SDE Cloud Server 111 to provide SDE service, such as creating and accessing secure data. For the creating and accessing, the SDE cloud server 111 creates security parameters for the SDE CI 115 if not provided by the SDE CI 115 and a unique Originator Transaction Identifier, such as Originator Data Transaction ID (ODTID), using the request/response commands of FIGS. 3C and 3D. Security Parameters consists of at least one randomly generated DDK and optionally randomly generated MSC ID. MSC ID has an associated Mask, Scramble and Compression Algorithms where any algorithm can be null function. The SDE cloud server 111 also creates access transaction record of security parameters that authorizes the SDE client viewer 116 to access security parameters indexed by Cloud ID, Cloud Transaction ID and Client Email Address to convert the original data from the secure data when authorized. The DBMS 117 can store the transaction records.

The SDE system server 113 can receive requests from the SDE Client Viewer 116, process the requests using the associated DBMS 118, and provide responses to the requests back to the SDE client viewer 116. Additionally, both the SDE CI 115 and the SDE client viewer 116 register via the SDE system server 113. Accordingly, registration via the SDE system server 113 is managed independent of the SDE cloud server 111, which provides SDE service in cloud computing service models. FIGS. 3A and 3B provide examples of the type of processing performed under the direction of the SDE system server 113. As shown in FIGS. 3A and 3B, the SDE service can include validating Recipient PWD/PIN, providing lost PWD/PIN, updating PWD/PIN, and providing Alpha-numeric ID/VMDDK of cloud service provider associated with Cloud email Address. More Query commands, such as represented in FIGS. 3A and 3B, may be subsequently added as required for an additional service of plurality of servers models.

The C-VPN CI 110 also uses a website download manager 160 for the user to download the SDE client viewer 116. The download manager 160 can be part of an SDE website wherein the user can download the SDE client viewer similar to how other programs or interfaces are downloaded from web sites. In FIG. 1B the website download manager is associated with the SDE website. In FIG. 1C, a website download manager 155 associated with the on-premises cloud service providers is shown. Both the website download manager 155 and 160 manage the functionality of downloading SDE Client Viewer (SCV), such as validating user email address who requested the download, providing a unique link to download the SCV, which user uses to download, and install the SCV.

The user Registers the CSV with the SDE System Server 113, 154, respectively, to each website where user download the SCV. The respective SDE System Server creates a registration database record for each User with User "SDE Email Address", PWD/PIN, Phone Number along with unique Alpha-numeric UID, Activation Date, Security Parameter VMDDK uniquely associated with User "SDE Email Address". The information can be stored in the related DBMS database of the SDE system servers. The SDE Cloud Interface (115) and SDE Cloud Server (117) can be operating within the computing system of cloud service provider (120).

As noted above, FIG. 1C illustrates a secure communication system 107 using a C-VPN CI 150 for on-premises cloud computing models. The phrase SDE (Secure Data Exchange) and C-VPN CI are interchangeably used and means one and same thing. For on-premises cloud computing model of FIG. 1C, SDE cloud server 153 and SDE system server 154 are managed by SDE integrated server 151 that directly receives FIG. 3A CMD type 312 and FIG. 3C CMD type 371 and redirects or sends the command requests to be processed by the appropriate integrated SDE severs, SDE Cloud server 153 or SDE System servers 154, based on the unique CMD type (312 or 371). An integrated DBMS 156 is shared by both SDE Cloud and System servers 153, 154. Integrated SDE Cloud and System servers 153, 154, use integrated DBMS 156 to perform the same database operation as distributed DBMS 151 117 and 118. The same element numbers in FIG. 1B reflect the same elements in FIG. 1C. The SDE Cloud Interface (115) and SDE Integrated Server (151) can be operating within the computing system of cloud service provider (120). Since, client viewer of C-VPN-CI does not require to be present at the user's device but can be downloaded either from an on-premises or distributed website managing C-VPN CI client viewer to view C-VPN CI data/documents with a link provided by the C-VPN CI data delivered to the user.

FIG. 2A illustrates a diagram of an example of a general format for creating a secure communication 200 for transmitting data from a cloud service provider to a user according to the principles of the disclosure. The secure communication 200 includes a secure header 210 and secure data 220 that are created using security parameters. The secure communication 200 can be sent to the user via a generic electronic message delivery system. The secure data is created using security parameters associated with an ID that corresponds to an originator of the data, and is identified with a generic extension, such as the extension ".sde". Another example of a generic extension is ".sdecx" where "x" is used to identify each "on-premises" SDE Integrated server such as represented in FIGS. 1C, 4A and 4B.

The secure header 210 includes an ODTID 230, a server IP address 240, an extension 250 of original data corresponding to the secure data, the Cloud ID 260 (an email address for the cloud service), a recipient ID (RID) 270, and a data name 280, which is a name or title of the original data, such as a document name. Secure document is used throughout the disclosure as an example of secure data. A secure message or secure electronic mail is another example of secure data. A secure video, audio, picture, and image are additional examples of secure data that can be created from original data.

One or more, including all, of the fields 230 to 280 of the secure header 210 can have a fixed size. The Cloud ID 260 and the data name 280 may exclude trailing spaces (blanks) and a Header Control field with a clear length field may be added to the secure header 210.

The security parameters include a set of mathematical rules and values for converting plain text to ciphertext. The security parameters include at least one randomly generated document dynamic key (DDK) and for additional security may further include one randomly generated MSC ID that has unique Scramble and Compression (MSC) algorithms. Anyone of the different MSC algorithms associated with each MSC ID may be null algorithms. A different set of security parameters can be used to create the secure header 210 than used to create the secure data 220. A first set of security parameters for creating the secure header 210 can be system DDK, which can also include a system MSC ID. The first set of security parameters can be fixed and denoted as SMDDK, and generated by C-VPN CI components, shared using common process by SDE CI of cloud service provider and SDE Client Viewer of User. A second set of security parameters for creating the secure data 220 can be DDK that is randomly generated for each secure communication 200, which can also include a randomly generated MSC ID to scramble and compress the original secure data, by the cloud service provider for each recipient, such as cloud service provider 120 and user 140 of FIG. 1B. The second set of security parameters can be denoted as MDDK, wherein a MDDK is uniquely generated to create each secure communication. When no MSC ID is generated for the MDDK, then the value is denoted as zero, such as in the commands of FIGS. 3B and 3D. Any MSC ID operations applied to create C-VPN CI data/document are applied in the reverse order by C-VPN CI client viewer of user 140 of FIG. 1B to reverse the scramble and compression of the data.

The server IP address 240 in FIG. 2A can be the IP address of a Cloud SDE server and/or SDE integrated server associated with an ID of the cloud service provider (Cloud ID), wherein server, server IP or IP Address are synonymous unless otherwise specified. The extension 250 can be the extension of a document, such as .docx, .pdf. .jpg and so forth. Additionally, the Cloud ID 260 can be an email address associated with the cloud service provider and the RID 270 can be the CID (Client ID) email address associated with the user. In some examples, RID is not required since the SDE email address of the user is the same as the CID email address. A SDE Client Viewer can create a content database record of a comma delimited list of CID-RID pairs to allow using RID associated with each Cloud ID for execution of requests/reply commands such as represented by FIGS. 3C and 3D where execution of request/reply commands implies that CID of cloud is linked to System Email Address of UID such as recovery email address to receive security parameters to access C-VPN CI data/document. A RID may not be required for on-premises cloud computing models wherein an SDE integrated server can be used as in FIGS. 4A and 4B. FIG. 2B provides an example of a general format 299 that does not include RID, wherein the same features are represented by the same element numbers.

In some examples, a server IP address may not be required in header 210 either. For example, a SDE Client Viewer can obtain a Cloud Server IP from a SSS (SDE System Sever) to use for requests and responses with a Cloud Server such as represented by the requests and responses of FIGS. 3C and 3D. Server IP address, such as server IP address 240, may not be required for cloud computing on-premises or service models having distributed servers. The server IP address of cloud servers can be obtained from SDE system servers by the SDE client. The Server IP may be excluded from header and added during SDE CI Registration and Query CMD 'u' to update any changes to Server IP by SDE CI and Query CMD 'a' to obtain Server IP by SDE Client Viewer using OID (Cloud ID)

The secure communication 200 also includes a generic secure name 295. Advantageously, the secure name does not indicate what or even the type of secure data in the secure communication 200. The secure name 295 can have an extension ".sde" or secure name 296 can have ".sdeX". The secure communication 200 also includes a time stamp and the secure name 295 (296) can be generated using the time stamp. For example, the secure name 295 (296) can be time stamp+Group ID (A . . . Z)+Document Sequence ID (1 . . . n). Time stamp corresponds to, for example, when sent and Group ID can correspond to cloud service provider and Document Sequence ID can be a number in sequence.

FIG. 3A illustrates a diagram of an example of a general format 300 for command requests from SDE CI or Client Viewer to a SDE System server according to the principles of the disclosure. More specifically, FIG. 3A represents the command requests sent directly to a distributed SDE System server or to an integrated SDE System server redirected by a SDE Integrated server. FIGS. 1C, 4A and 4B illustrate examples of a SDE CI and a Client Viewer in a C-VPN CI corresponding to an on-premises model and FIGS. 1B, 5A and 5B illustrate examples of a SDE CI and a Client Viewer in another example of a C-VPN CI in a service model. The general format 300 for the command requests includes a header control 310 and a secure command request 320.

The header control 310 includes the command type 312 and the UID 316. The command type 312 include Registration, Verify Password/Pin, Update Password/Pin, Forgot Password/Pin, and a Query command to obtain Server IP. The various password/pin related requests (Verify, Update, Forgot) and the Query command are used by both SDE CI and user SDE clients (also referred to herein simply as SDE client). A SDE CI and a Client Viewer can use the Registration command and 'u' to update Server IP by SDE CI and Query CMD 'a' to obtain Server IP by SDE Client Viewer using OID (Cloud ID).

The secure command request 320 includes UID Authentication 321 and different Header Data fields denoted by element numbers 323 to 329. The different types of Header Data 323 to 329 can be included in the various command types 312 as indicated in the secure command request 320. For example, the Registration request includes an authentication code, VMDDK if provided by UID, type of viewer identified by either SDE CI or SDE Client Viewer (e.g., C for SDE CI and U for SDE Client Viewer), phone number of user, and PWD/PIN to use for registration.

The UID 273 is "SDE Email Address" defined in Profile as "SDE Email Address" by the user of the C-VPN CI Client Viewer or Cloud Email Address of the Cloud service provider. The "SDE Email Address", "System Email Address" and "CVPN System Email Address" are interchangeably used, means one and same thing. VMDDK are security parameters uniquely associated with each UID (Email Address). Each VMDDK include AES DDK and optional (for enhanced security) MSC ID that may be used and is also uniquely associated with each UID (Email Address). The VMDDK is used to secure the secure command request 320.

The Authentication Code is fixed size data uniquely associated with the UID Email Address that authenticates UID who initiated the command request. If UID authentication fails then SDE system server rejects the command request and returns an error message to UID upon creating log record of invalid command requests and IP address of the UID who initiated the invalid command request.

RID is "SDE Email Address" as defined in the SDE Client profile that is registered with the distributed SDE System server of FIG. 1B or FIGS. 5A and 5B or with an integrated SDE System server when a CMD type 312 is redirected by SDE Integrated Server such as implemented in the SDE integrated server of FIGS. 1C, 4A and 4B.

FIG. 3B illustrates a diagram of an example of a general format 330 of a response from the distributed or integrated Cloud SDE server to the command requests of FIG. 3A according to the principles of the disclosure. The general format 330 for a command response includes a header control 340 and a secure command reply 350. The header control 320 includes the command type 342, status 344, and action 346. The command type 342 corresponds to the different type of commands listed for the command type 312 in FIG. 3A. The command type 342 include Registration (R), Verify Password/Pin (V), Update Password/Pin (U), and Forgot Password/Pin (F). A response to the Query command of FIG. 3A is 'u' for SDE CI to update the Server IP of SDE Cloud Server or Integrated Server and 'a' to access Server IP by the SDE Client Viewer using OID (Cloud ID).

The status 344 indicates if the requests from FIG. 3A were successful or unsuccessful (i.e., if there was an error). The action 346 indicates the type of action taken for the particular type of requests depending of if the requests was successful or unsuccessful. Examples of types of actions include "Process Input" and "Display Error". For Forgot PW/PN, a notification message can be displayed indicating the PW/PN is to be sent to the UID email address. An error message can also be displayed as with the actions for the other types of commands.

The secure command reply 350 is secured using the same security parameters, VMDDK, as used with the associated command requests of FIG. 3A. The secure command response 350 includes response fields 352, 354, and 356 that include responses to the particular type of command requests. As noted in FIG. 3B, a response to the Registration includes "Initial Activation Date" in response field 352, OID (Alpha-Numeric User ID) in response field 354, and VMDDK in response field 356 if not provided by UID. For the reply command C, response field 352 includes Cloud ID (Alpha Numeric ID) and response field 354 includes VMDDK of Cloud ID.

FIG. 3C illustrates a diagram of an example of a general format 360 for command requests from a SDE CI and Client Viewer to a distributed or an integrated SDE Cloud server according to the principles of the disclosure. The general format 360 for the command requests includes a header control 370 and a secure command request 374. The header control 370 includes the command type 371 and the UID 373. The command type 371 includes create secure data for sending to a user (C), access the secure data (A), and revoke the authorized access of the user (R). For each of the command types, the UID is the OID, which is an Alpha Numeric Cloud ID assigned to a cloud service provider associated with each cloud service provider email address. The OID is received by the SDE CI upon registration with the SDE system server. The OID can also be each cloud service provider's email address.

The secure command request 320 includes UID Authentication 375 and different Header Data fields denoted by element numbers 376, 377, and 378. The different types of Header Data 376 to 378 can be included in the various command types 371 as indicated in the secure command request 374. For example, the create command includes an authentication code, MDDK if created by OID, and the email address for the user (which is also referred to herein as a client or recipient). The authentication code is a fixed size alpha numeric string uniquely associated with each UID. Additionally, the access command includes RID, which can be the client email address received in the document header 2A. The VMDDK is used to secure the secure command request 374.

FIG. 3D illustrates a diagram of an example of a general format 380 of a response from a Cloud SDE server to the command requests of FIG. 3C according to the principles of the disclosure. The general format 380 for the command requests includes a header control 390 and a secure command request 395.

The header control 390 includes the command type 391, status 392, and action 393. The command type 391 corresponds to the different type of commands listed for the command type 371 in FIG. 3C. The command type 391 include Create (C), access (A), and revoke (R).

The status 392 indicates if the requests from FIG. 3C were successful or unsuccessful (i.e., if there was an error). The action 393 indicates the type of action taken for the particular type of requests depending of if the requests was successful or unsuccessful. The actions would be performed by the SDE CI or the Client Viewer. Examples of types of actions include "Process Input" and "Display Error". A revoke command is considered successful if the user has not accessed the secure data. A revoke flag can be set to stop the user from accessing a received secure document. An error message can also be displayed as with the actions for the other types of commands.

The secure command reply 395 is secured using the same security parameters, VMDDK, as used with the associated command requests of FIG. 3C. The secure command response 395 includes response fields 397, 398, and 399 that include responses to the particular type of command requests. As noted in FIG. 3D, a response to the create command includes ODTID in response field 397 and MDDK in response field 398 if not sent by OID. MDDK is also sent in response field 398 to an access command.

As noted above with respect to FIGS. 1C, FIGS. 4A and 4B provide examples of a C-VPN CI for an on-premises cloud computing model, such as may be used by large corporations and government entities. Using the on-premises configuration of the C-VPN CI allows an on-premises entity to manage its own C-VPN CI using the entities unique ".SDEX" extension as noted in FIGS. 2A and 2B. In the on-premises cloud computing models, such as in FIGS. 1C, 4A, and 4B, the SDE Client Viewer requires a different generic document extension so it can be defined in the operating system (OS) of the user computing device to start the SDE Client Viewer to view secure data, such as a document, with an extension .SDEX. In contrast, SDE client viewers in cloud computing service models, such as represented in FIGS. 1B, 5A, and 5C, use a generic system extension, such as .SDE, to view secure documents.

For the on-premises cloud computing models, the SDE client viewer is provided to a user by a server operating under the on-premises entity, such as an SDE integrated server. In such C-VPN CI configurations, the Client Email Address (RID) should be set as "SDE Email Address" and the RID Field in FIG. 2A is not necessary because RID and "SDE Email Address" are same. FIG. 2B illustrates such a format.

FIG. 4A illustrates a system diagram of an example of a C-VPN CI 400 having a SDE integrated server (SIS) 410 and that is used with on-premises cloud computing models according to the principles of the disclosure. The C-VPN CI 400 allows a cloud service provider to send secure data to a user (or users) over a generic electronic message delivery system. The secure data can be sent in a secure communication such as in FIG. 1C. In addition to the SIS 410, the C-VPN CI 400 includes SDE Cloud Server (SCS) 421, SDE System Server (SSS) 423, SDE CI 412, server DBMS 414, SDE client viewer 416, and user DBMS 418. The C-VPN CI 400 also includes a website download manager that operates as website download manager 160 of FIG. 1C.

The SIS 410 is configured to manage the C-VPN CI 400 and to operate as the SDE integrated server 150 of FIG. 1C. As such, the SIS 410 includes SCS 421 and a SSS 423. SIS 410 directly receives FIG. 3A CMD types 312 and FIG. 3C CMD types 371 and upon receipt redirects to SCS 421 or SSS 423 based on the unique type of command request. Both SCS 421 and SSS 423 process command requests the same as distributed plurality of servers, such as in FIG. 1B, including database operations using integrated DBMS 414 instead of distributed DBMS such as 117 and 118 of FIG. 1B. Upon processing command requests, SCS 421 and SSS 423 return responses back to SDE CI 412 or SDE Client Viewer 416 who created the command requests. A system administrator (SA) or a transaction data manager (TDM) for the cloud service provider can communicate with the SCS 421 to review a database of transactions to send to one or more users that provides Access Timestamp when user accesses the secure communication or secure data similar to registered mail service. SA of on-premises cloud computing model receives all SDE components, including installation instructions to install and test functionality of all SDE components from C-VPN on-premises cloud SDE service provider. For example, SDE Components includes SDE CI and related handshake/C-VPN interfaces installed by SA. SA Registers SDE CI with PWD/PIN created by SA with Cloud Class ID, such as M for MyChart, B for Capital One bank, etc., and upon registration SDE CI receives Alpha-Numeric OID (Alpha-numeric cloud ID) from the SSS 423 who process the registration command request via SIS 410. As such all C-VPN SDE Service Components are designed with functionality of 1C infrastructure shown in FIGS. 4A & 4B.

The TDM can be used by the cloud service provider to manage the delivery of secure data to users and the access status of the users receiving the secure data. The secure data is created from original data using security parameters obtained from the SCS 421 via SIS 410. The SDE CI 412 can create the secure data from the original data. The original data is created by the cloud service provider via the computing system 420. The SDE CI 412 can receive the original data by capturing an electronic message created by the TDM that includes the original data. The SDE CI 412 can also receive the original data via one or more communications API with the TDM. The SDE CI 412 creates a secure communication that includes the secure data for sending to the user. An example of the format for the secure communication is provided in FIG. 2B. Once created, the SDE CI 412 can send the secure communication to the user over a generic message delivery system.

The user, represented in FIG. 4A with a computing device, receives the secure communication from the cloud service provider. To be able to process the secure communication, the user will need the SDE client viewer 416 downloaded to the computing device from Cloud Website using download manager 415. The user does not have to have the SDE client viewer 416 downloaded to receive the secure communication. The secure communication can include instructions and a link to obtain the SDE client viewer 416 from company website using download manager 415. For the first time download, the SDE client viewer 416 is registered with PWD/PIN by the user identifying user by SDE Email Address (same as Client Email Address). For the on-premises model, the SDE client viewer is provided by the SDE Download Manager 415 from company website (cloud service provider website) and the secure data includes the cloud specific extension .SDEX.

Validity of registration is confirmed if PWD/PIN provided by user of SDE client viewer 416 matches with PWD/PIN provided during registration process with SDE integrated server 410. In case of use of SDE client viewer 416 on multiple computing devices associated with the user, the PWD/PIN entered during registration is matched against prior registration process.

To access the secure data in the secure communication, the user obtains security parameters from the SDE integrated server 410 that were used to create the secure data from the original data. An access command as described in FIG. 2B can be used to obtain the security parameters. The user can only obtain the security parameters if authorized by the cloud service provider. Once the secure data is converted to the original data, the original data is formatted for storage in the user DBMS 418.

The server DBMS 414 is configured to store the security parameters, PWD/PIN, and other data used by the SDE integrated server 412 to manage operation of the C-VPN CI 400.

FIG. 4B illustrates a system diagram of another example of an on-premises cloud computing model that uses C-VPN CI 400 according to the principles of the disclosure. In FIG. 4B, the C-VPN CI 400 is used with healthcare cloud computing. As such, computing system 430 is a healthcare computing system from a healthcare cloud service provider, such as MyChart, that receives healthcare data, such as electronic medical records (EMR) and/or electronic health records (EHR), from one or more different healthcare providers and acts as a portal for the healthcare data. In FIG. 4B, the healthcare data from a doctor 422, hospital 424, or other healthcare provider 426 are provided as examples. The operation of the computing system 430 and C-VPN CI 400 is the same as with the computing system 420 and the C-VPN CI 400 in FIG. 4A with the cloud service provider being specifically related to healthcare and the user being a patient of one of the healthcare providers. Using MyChart as an example, the C-VPN CI 400 allows MyChart to securely send lab results, doctor's medical record update, appointment reminders, etc. thereby eliminating the users' need to logon to the My Chart for this information. The SDE Cloud Interface (412) and SDE Integrated Server (410) can be running under the computing system (420 in FIG. 4A or 430 in FIG. 4B) of the cloud service provider.

FIG. 5A illustrates a system diagram of an example of a C-VPN CI 500 having distributed servers, SDE cloud server (SCS) 510 and SDE system server (SSS) 514, and used with cloud computing service models according to the principles of the disclosure. Thus, instead of a SIS such as with C-VPN CI 400, SCS 510 and SSS 514 manage and direct the operation of C-VPN CI 500. For example, SCS 510 manages the create and access commands denoted in FIGS. 3C and 3D and also manages associated DBMS 513. SSS 514 manages the commands and responses of FIGS. 3A and 3B and also manages associated DBMS 515. In addition to the SCS 510 and the SSS 514 and the associated DBMS 513, 515, the C-VPN CI 500 includes SDE CI 512, SDE client viewer 516, and user DBMS 518. The C-VPN CI 500 also includes a website download manager 521 that operates as website download manager 155 of FIG. 1B. The SDE CI 512, the SDE client viewer 516, and the user DBMS 518 are configured to operate as the corresponding SDE CI 412, SDE client viewer 416, and user DBMS 418 of FIGS. 4A and 4B.

FIG. 5B illustrates a system diagram of another example of a cloud computing service model that uses C-VPN CI 500 according to the principles of the disclosure. In FIG. 5B, the C-VPN CI 500 is used with healthcare cloud computing as described in FIG. 4B. As such, computing system 530 is a healthcare computing system from a healthcare cloud service provider, such as MyChart, that receives healthcare data from one or more different healthcare providers and acts as a portal for the healthcare data. In FIG. 5B, the healthcare data from a doctor 522, hospital 524, or other healthcare provider 526 are provided as examples. The operation of the computing system 530 and C-VPN CI 500 is the same as with the computing system 520 and the C-VPN CI 500 in FIG. 5A with the cloud service provider being specifically related to healthcare and the user being a patient of one of the healthcare providers. Using MyChart as an example, the C-VPN CI 500 allows MyChart to securely send lab results, doctor's medical record update, appointment reminders, etc. to the user thereby eliminating the users' need to logon to the My Chart for this information. The SDE Cloud Interface (512) and SDE Cloud Server (513) can be running under the computing system (520 in FIGS. 5A and 530 in FIG. 5B) of the cloud service provider.

FIG. 6 illustrates an example of a chart 600 for managing Inbound Transaction data from various cloud service providers using a C-VPN CI, such as represented in FIGS. 4A to 5B. The chart 600 can be used as part of an archive and access system for secure data received via secure communications from cloud service providers. The secure data that is received can be identified and grouped as from different cloud service providers.

The verifying PWD/PIN used by SDE client viewers as disclosed herein protects secure data, such as identified in FIG. 6, on the user's computing devices even if PWD/PIN discovered. The User can change the PWD/PIN using other devices sharing the content of the stolen device or at a SDE system server. The SDE client viewer on a stolen device contain the old PWD/PIN and any access to secure data on the stolen device is not accessible because the old and new PWD/PIN at SDE system server will not match.

In FIG. 6, secure documents are used as an example of secure data received by a user and stored on a user DBMS, such as DBMS 418 or 518. The chart 600 has a header row that indicates the sent date 611, sent time, 612, an identifier of the secure document 613, originator (cloud service provider) 615 of the secure document, Cloud Class ID 616, Access Date 617, and Access Time 618. The identifier of the secure document 613 can be a secure name such as shown in the various rows for the different documents. The Cloud Class ID 616 can be represented by a name of the cloud service provider that corresponds to the Cloud Class ID 626.

FIG. 7A to 7D illustrate flow diagrams corresponding to one or more algorithms for operating portions of a C-VPN CI. Operating instructions can direct the operation of one or more computing devices according to the flow diagrams to perform operations for the C-VPN CI.

FIG. 7A illustrates a flow diagram of an example of a method of sending a secure communication by a SDE CI according to the principles of the disclosure, wherein the secure communication includes secure data created from original data. The method 700 begins in step 701 by receiving original data to send to a user. The original data is from a cloud service provider that can be identified by a cloud email address and the user can be identified by a client email address. In addition to the original data and the cloud and client email addresses, the model type (i.e., on-premises or service) and a server IP address (e.g. IP address associated with CSS or SIS) associated with the cloud service provider can be received. The information in step 701 can be sent from a TDM operating on a computing system of the cloud service provider and can be received by the SDE CI using an Inter Process Communication (IPC) interface with TDM performing remaining steps that can also be operating on the same computing system. The information in step 701 can include processing by C-VPN servers, CSS or SIS.

In step 702 a determination is made if the information of step 701 was received without error. If so, a create command is generated and sent to enable creating secure data from the original data. An example of a create command is in FIG. 3C and can be sent to a SCS, directly or via a SIS depending on the model type.

In step 703, a response is received from the create command to enable creation of a secure data from the original data and a secure communication to send the secure data to the user. FIG. 3D provides an example of a response to a create command. The response from the SCS includes ODTID and security parameters to create the secure data and secure communication.

In step 704, one or more secure data and communication is created. The SDE CI can use the received security parameters to create the secure data and secure communication to send to the user. FIG. 2A provides an example of secure communication for a service model and FIG. 2B provides an example of a communication for an on-premises model.

A determination is made in step 705 if a generic email address for the user was received. If not, the method 705 continues to step 706 and the SDE CI sends the secure communication to the user (CID) over a generic electronic messaging system using the client email address. If determining in step 705 that a generic email address for the user was received, the SDE CI sends the secure communication to the user over the generic electronic messaging system using the client generic email address.

When successfully sent from steps 706 and 707, a response is generated indicating the secure communication was successfully sent in step 708. If unsuccessfully sent, an error code is generated and sent in step 709. Both the success response and the error code can be sent to the TDM. The response can be sent to the TDM. For steps 701 to 704, an indication can also be sent to the TDM when an error occurs instead of success for each step.

FIG. 7B illustrates a flow diagram of an example of a method 710 of processing a received secure communication by a user according to the principles of the disclosure, wherein the secure communication includes secure data created from original data. The method 710 is performed by a SDE client viewer associated with the user. Method 710 can be used with an on-premises cloud computing model and a cloud computing service model. The secure communication can identify the type of model used by the cloud service provider that sent the secure communication and the SDE client viewer for the type of model can be used. FIGS. 2A and 2B provide an example of the secure communication. For example, the extensions, such as .sde and .sdxe can be used to identify the type of model. The secure communication can be sent via the method 700, such as via step 706 or 707.

In step 711, the secure communication is received. The SDE client viewer receives the secure communication from the cloud service provider via a generic electronic message delivery system. If not successfully received, an error code is displayed to the user. In block 712, the original document header is received or obtained by, for example, converting Document Header included in the received secure communication using security parameters associated with OID. The obtained or received original document may include blank fields, such as the Cloud Server IP field of FIG. 2A (Distributed Servers Model) or 2B (Integrated Server Model) or the RID field in FIG. 2A. If the Server IP field is blank, a retrieve using Query "a" CMD from SSS (SDE System Server) can be used. If the RID field is blank, then a retrieve RID from CID-RID list created by SDE Client Viewer can be used, such as used to execute Request/Reply CMD with Cloud Server as represented by FIGS. 3C and 3D.

In block 713, an access CMD, such as in FIG. 3C, is sent to a SDE Cloud server, such in FIGS. 1B, 5A, and 5B, or in FIGS. 1C, 4A, and 4B. If successful, a response, such as represented by FIG. 3D, is received in step 714 from the SDE cloud server. The response includes information, such as the security parameters and Cloud Class ID, to convert the secure data back to the original data. In step 715, the secure data is converted to the original data using the security parameters. The original data is then displayed in step 716. The original data is displayed on a computing device of the user, which can be the same computing device having the SDE client viewer. The original data can be displayed using the corresponding application of the original data, such as Word or PDF. In block 717, an audit trail of communications is updated and the original document is stored in a DBMS, such as 418 or 518. The user can access the original data from the DBMS at a later time user proper identification, such as PWD/PIN. As indicated in FIG. 7B, an error code or indication of failure is reported/displayed to the user if a function of a block is unsuccessful.

FIG. 7C illustrates a flow diagram of an example of a method 750 of operation by a SDE System server according to the principles of the disclosure. In method 750, the SDE system server receives a command request and replies with a command response. FIGS. 3A and 3B provide examples of the request and response commands, respectively. Method 750 begins in step 751 when a request command is received.

The request CMD can be received from a SDE CI. As noted in FIG. 7C, the request CMD is logged with the IP address from which received. A determination is then made in step 722 if the request CMD includes valid data. Valid data can be determined by checking the Header Control for valid CMD and UID, loading user's data record that is found with UID, creating UID authentication code using user's data, converting secure data header using security parameters (e.g. VMDDK) associated with each OID (Cloud ID or UID) to obtain clear header data, and determining if authentication code is matched with UID authentication code. If a match, then request CDM includes valid data.

If the data of the request CMD is valid, then another determination is made is block 753 if the UID is valid. A valid UID can be determined by comparing Create Auth Code of UID to UID of the request CDM. If the UID is valid, the method continues to a series of determination blocks 754 to 756. In block 754, a determination is made if the received request CMD is a registration CMD. If not, a determination is made in block 755 if the request CMD is PWD/PIN CMD. If not a PWD/PIN CMD, a determination is made in block 756 if the request CMD is a query CMD.

Returning to block 754, if the request CMD is a registration CMD, a determination is made in block 760 if the registration request is valid. Validity can be determined by checking if user made the download request, if user has/used a verified e-mail address and if there is pending registration flag in user's database record. If valid, the registration is processed in block 761 and recorded in the DBMS associated with the SDE System Server. The DBMS can be configured as a conventional secure database and includes database management systems that manage entries into an SDE Account List or SDE Transaction List. The DBMS can be operable with or via XTML. Once registration is processed, a response is created in block 762 and sent in block 769 that indicates a successful registration. As indicated in FIG. 7C (by the various boxes include "1"), a response indicating a failure or unsuccessful action can also be sent in block 769. The response can correspond to the format as shown in FIG. 3B and be sent to the SDE CI that sent the request CMD.

Returning to block 755, if the request CMD is a PWD/PIN CMD, the processing continues to block 763 and a determination is made if it is valid PWD/PIN CMD. If a valid PWD/PIN CMD, then method 750 continues to step 764 where PWD/PIN CMD is processed. If PWD/PIN CMD is for verification, then PWD/PIN can be verified with user's PWD/PIN of the user's database record. If PWD/PIN CMD is for updating, the user's PWD/PIN in the user's data record is updated. If valid and after processing, a response is created in block 765 and sent in block 769 that indicates a valid PWD/PIN. The PWD/PIN with Update CMD is also stored in the DBMS associated with the SDE System server.

Returning to block 756, if the request CMD is a query CMD, the processing continues to block 766 and a determination is made if the query request is valid. Validity can be determined by checking for valid Query Data in the Header Control, such as in FIG. 3A Query CMD. If valid, the query is processed in block 767 and results of the query are stored in the DBMS. A response is created in block 768 and sent in block 769 that includes results of the query.

FIG. 7D illustrates a flow diagram of an example of a method 780 of operation of a SDE Cloud server according to the principles of the disclosure. In method 780, the SDE cloud server receives a command request and replies with a command response. FIGS. 3C and 3D provide examples of the request and response commands, respectively. Method 780 begins in step 781 when a request command is received.

The request CMD received in step 780 can be from a SDE CI and/or user via a SDE client viewer. As noted in FIG. 7D, the request CMD with IP address is logged. A determination is then made in step 782 if the request CMD includes valid data. Validity can be determined as determined in step 752 above of FIG. 7C. If the data of the request CMD is valid, then another determination is made is block 783 if the UID is valid. A valid UID can be determined by comparing Create Auth Code of UID to UID of the request CDM. If the UID is valid, the processing continues a series of determination blocks 784 to 785. In block 784, a determination is made if the received request CMD is a create CMD. If not, a determination is made in block 785 if the request CMD is an access CMD. Determining the type of CMD in blocks 784, 785, can be based on the type of CMD identified in the header of the received request CMD.

Returning to block 784, determining validity can be performed, for example when the CMD="C", by checking if Request CMD contains valid data, such as recipient's email address as shown in FIG. 3C. If the request CMD is a valid create CMD, the processing continues to block 786 and the create CMD is processed and results of the create CMD are stored in the DBMS. A "C" CMD creates database record in SCS DBMS index by OID, ODTID and RID (Email Address) with MMDK and other relevant data to be used in response to "A" CMD by OID (e.g., cloud ID or user ID) to return MDDK. A response is created in block 787 that indicates success and is sent in block 799 that includes at least ODTID & MDDK if not sent by OID as shown in FIG. 3D. The DBMS can be configured as the DBMS of the SDE System server discussed in FIG. 7C. As in FIG. 7C, a response indicating a failure or unsuccessful action can also be sent in block 799 (indicated by the various boxes including "1"). The response can correspond to the format as shown in FIG. 3D and can be sent to the SDE CI who sent the request create CMD.

Returning to block 785, if the request CMD is a valid access CMD, the processing continues to block 788. Validity can be determined by checking if CMD='A' and CMD Request data contains at least OID & ODTID as shown in FIG. 3C. In block 788 the access CMD is processed. The results of the access CMD are stored in the DBMS. A response is created in block 789 and sent in block 799 that at least includes MDDK & Cloud Class ID and/or E-mail address of OID as shown in FIG. 3D and can be sent to the user/client/Patient/Recipient who sent the request access CMD.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

As will be appreciated by one of skill in the art, the disclosure or parts thereof may be embodied as a method, system, or computer program product. Accordingly, the features disclosed herein, or at least some of the features, may take the form of an entirely hardware embodiment, an entirely software embodiment (including firmware, resident software, micro-code, etc.) or an embodiment combining software and hardware aspects all generally referred to herein as a "circuit" or "module." Some of the disclosed features may be embodied in or performed by various processors, such as digital data processors or computers, wherein the computers are programmed or store executable programs of sequences of software instructions to perform one or more of the steps of the methods. Thus, features or at least some of the features disclosed herein may take the form of a computer program product on a non-transitory computer-usable storage medium having computer-usable program code embodied in the medium. The software instructions of such programs can represent algorithms and be encoded in machine-executable form on non-transitory digital data storage media.

Thus, portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Those skilled in the art to which this application relates will appreciate that other and further additions, deletions, substitutions and modifications may be made to the described embodiments.

Each of the aspects disclosed in the Summary can include one or more of the below dependent claims in combination.

What is claimed:

1. A system for sending a secure communication from a cloud computing system to a computing device of a user over the internet using a plurality of servers of a connectionless-virtual private network communication infrastructure (C-VPN CI), the system comprising:
   a C-VPN CI cloud interface operating on the cloud computing system;
   a C-VPN CI client viewer operating on the computing device of the user, wherein the computing device is external to the cloud computing system;
   a C-VPN CI cloud server that is one of the plurality of servers and is configured to exchange security parameters with the C-VPN CI cloud interface, wherein the security parameters include at least one randomly generated document dynamic key (DDK) and one randomly generated Scramble, and Compression (MSC) ID that has unique Scramble and Compression Algorithms for converting unsecured data to secure data;
   wherein the C-VPN CI cloud interface is configured to create a secure communication using the security parameters, wherein the secure communication includes a secure header and secure data, wherein creating the secure data includes applying both the DDK and the Scramble and Compression Algorithms associated with the MSC ID to original data from the cloud computing system that corresponds to the secure data, and the C-VPN CI cloud interface is further configured to send the secure communication to the computing device of the user over the internet via a generic electronic message delivery system.

2. The system as recited in claim 1, wherein the generic electronic message delivery system is an unsecured email system.

3. The system as recited in claim 1, wherein the secure communication includes a generic document name with an extension .sdex or an extension corresponding to the cloud computing system.

4. The system as recited in claim 1, wherein the DDK includes at least one randomly generated symmetric key that adheres to the principles of AES-256 encryption.

5. The system as recited in claim 1, wherein the secure header includes a combination of at least four of an Originator Cloud Computing System Data Transaction Identifier (ODTID), an extension of the original data, a Cloud ID of the cloud computing system, a Cloud Server IP, a recipient ID (RID), and a name for the original data, and the C-VPN CI cloud interface is configured to create the secure header by applying fixed security parameters of the C-VPN CI.

6. The system as recited in claim 1, wherein the C-VPN CI cloud interface is configured to obtain the original data by capturing an electronic message created by a transaction data manager (TDM) operating on the cloud computing system, wherein the electronic message includes the original data, a Cloud email address of the cloud computing system, and an electronic mail address of the user.

7. The system as recited in claim 1, wherein the C-VPN CI cloud interface is configured to generate a create command and receive a response of the create command for the exchange of the security parameters with the C-VPN CI cloud server, wherein the create command includes an authentication code that is a fixed size alpha numeric string and includes a Cloud ID of the cloud computing system and a Recipient Email Address.

8. The system as recited in claim 1, wherein the computing device is configured to receive the secure communication and the C-VPN client viewer is configured to obtain the security parameters from the C-VPN CI Cloud server using a Cloud ID of the cloud computing system, a Cloud Originator Transaction ID, and a Recipient Email Address, and to convert the secure data to the original data using the security parameters.

9. The system as recited in claim 1, wherein the plurality of servers includes a C-VPN CI system server that is configured to download and register the C-VPN client viewer to the computing device of the user, wherein the secure communication includes a link for the downloading.

10. The system as recited in claim 1, wherein the plurality of servers includes a C-VPN CI system server and the C-VPN-CI cloud interface is further configured to:

obtain a password or PIN and cloud environment data from a system administrator (SA) of the cloud computing system;

transmit a registration request to the C-VPN-CI system server; and obtain an originator identifier (OID) from the C-VPN-CI system server, wherein the OID comprises a prefixed logical address that includes "C" and a numeric value of a cloud computing system IP of the cloud computing system.

11. The system as recited in claim 1, wherein the C-VPN-CI cloud server is further configured to create a database management system (DBMS) record authorizing the user to access the security parameters, wherein the DBMS record includes a cloud ID of a cloud computing system, an Originator Data Transaction Identifier (ODTID) of the cloud ID, and a recipient email address associated with the user, wherein the authorizing is granted only if there is a DBMS record associated with the recipient email address.

12. The system as recited in claim 4, wherein the MSC ID is zero and has no associated Scramble and Compression Algorithms.

13. The system as recited in claim 5, wherein the C-VPN CI client viewer is configured to obtain the secure header associated with a secure document having an extension .sdex from the generic electronic message delivery system and access the original data by applying fixed security parameters of the CVPN-CI.

14. The system as recited in claim 5, wherein the Cloud ID is an email address for the cloud computing system.

15. The system as recited in claim 5, wherein the RID is an email address of the user.

16. The system as recited in claim 7, wherein the C-VPN CI cloud server is configured to create a unique database record using the Cloud ID, the Cloud Originator Transaction ID, and the Recipient Email Address.

17. The system as recited in claim 9, wherein the C-VPN CI system server and the C-VPN CI cloud server are integrated with a C-VPN CI integrated server.

18. The system as recited in claim 10, wherein the C-VPN-CI includes a plurality of servers that includes the C-VPN-CI system server and a different server that is a C-VPN-CI cloud server.

19. The system as recited in claim 11, wherein the ODTID consists of a unique numeric transaction ID appended with an HTTP protocol-compliant header segment ID used by the cloud computing system to redirect a request for the access to the cloud server.

20. The system as recited in claim 18, wherein the C-VPN-CI cloud server and the C-VPN-CI system server are integrated within a C-VPN-CI integrated server.

21. A method for a connectionless-virtual private network communication infrastructure (C-VPN-CI) client viewer operating on a computing device of a user to obtain security parameters from a C-VPN-CI cloud server to convert secure data into original data using a secure header, wherein a.sdex document includes the secure header and the secure data, comprising:

obtaining an alpha numeric cloud ID of a cloud computing system from a C-VPN-CI system server using a cloud email address contained in the secure header;

obtaining a cloud server address as a cloud server IP from the secure header and a segment ID from an ODTID contained in the secure header;

transmitting a request for the security parameters to the cloud computing system using an IP address obtained from the alpha numeric cloud ID, the request containing an HTTP protocol-compliant header comprising header fields including a host field containing the cloud server address and a segment-ID field representing the segment ID; and obtaining, from a reply provided by the C-VPN-CI cloud server, the security parameters used to convert the secure data into the original data, wherein the security parameters include at least one randomly generated document dynamic key (DDK) and one randomly generated Scramble, and Compression (MSC) ID that has unique Scramble and Compression Algorithms that was used for converting the original data to the secure data.

22. The method as recited in claim 21, wherein the cloud computing system receives the request containing the HTTP protocol-compliant header and resolves the cloud server address and the segment ID from the header fields to determine how to route and process the request, and returns a response to the C-VPN-CI client viewer.

23. The method as recited in claim 21, further comprising modifying, by a C-VPN-CI cloud interface, the secure header to be compatible with a HTTP protocol-compliant header.

24. The method as recited in claim 21, wherein the obtaining the cloud server address includes formatting the cloud server IP as the cloud server address by the C-VPN CI cloud interface.

25. The method as recited in claim 22, wherein the routing resolved from the HTTP protocol-compliant header satisfies routing policies governing incoming requests to the cloud computing system of the cloud infrastructure of the cloud service provider.

* * * * *